(12) United States Patent  
Sawamoto

(10) Patent No.: US 8,995,904 B2  
(45) Date of Patent: Mar. 31, 2015

(54) BASE STATION, RELAY STATION, WIRELESS COMMUNICATION SYSTEM, AND WIRELESS COMMUNICATION METHOD

(75) Inventor: Toshiro Sawamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 419 days.

(21) Appl. No.: 13/323,367

(22) Filed: Dec. 12, 2011

(65) Prior Publication Data

US 2012/0083202 A1    Apr. 5, 2012

Related U.S. Application Data

(63) Continuation of application No. PCT/JP2009/061102, filed on Jun. 18, 2009.

(51) Int. Cl.
*H04B 7/15* (2006.01)
*H04W 52/46* (2009.01)
*H04B 7/155* (2006.01)

(52) U.S. Cl.
CPC ........... *H04W 52/46* (2013.01); *H04B 7/15535* (2013.01)
USPC .................. 455/7; 455/9

(58) Field of Classification Search
CPC ........... H04B 7/15542; H04B 7/15592; H04B 7/15507; H04B 7/14; H04B 7/15; H04B 7/15528–7/15557; H04W 84/047; H04W 88/04
USPC .......................................... 455/7, 9; 370/315
See application file for complete search history.

(56) References Cited

U.S. PATENT DOCUMENTS

| | | | |
|---|---|---|---|
| 7,702,280 B2 | 4/2010 | Takeda et al. | |
| 2003/0162514 A1* | 8/2003 | Chu et al. | 455/127 |
| 2006/0146741 A1 | 7/2006 | Muraoka | |
| 2008/0181168 A1 | 7/2008 | Han et al. | |
| 2009/0047971 A1 | 2/2009 | Fu | |
| 2009/0053994 A1 | 2/2009 | Senarath et al. | |
| 2010/0214930 A1* | 8/2010 | Hu et al. | 370/241 |
| 2010/0304665 A1 | 12/2010 | Higuchi | |

FOREIGN PATENT DOCUMENTS

| | | |
|---|---|---|
| CN | 1589053 | 3/2005 |
| CN | 1714523 | 12/2005 |

(Continued)

OTHER PUBLICATIONS

Notice of Preliminary Rejection issued for corresponding Korean Patent Application No. 10-2011-7027532, mailed May 14, 2013, with an English translation.

International Search Report issued for corresponding International Patent Application No. PCT/JP2009/061102, mailed Sep. 15, 2009. English translation attached.

Notice of Rejection issued for corresponding Japanese Patent Application No. 2011-519365, mailed Mar. 5, 2013, with partial English translation.

(Continued)

*Primary Examiner* — Gennadiy Tsvey
(74) *Attorney, Agent, or Firm* — Myers Wolin, LLC

(57) ABSTRACT

This disclosure relates to a base station where the base station includes a selector that based on wireless communication states with each mobile station, selects a mobile station for which amplification is to be performed at a relay station; and a reporter that reports information related to the mobile station selected by the selector, wherein the reporter has a function of transmitting report information to the relay station and reports as the report information, the information related to the mobile station and information concerning a gain factor that is selected based on the number of mobile stations for which amplification is to be performed.

14 Claims, 19 Drawing Sheets

(56) References Cited

FOREIGN PATENT DOCUMENTS

| | | |
|---|---|---|
| CN | 101039526 | 9/2007 |
| JP | 2005-303613 | 10/2005 |
| JP | 2006-501759 | 1/2006 |
| JP | 2006-135641 | 5/2006 |
| JP | 2009-55185 | 3/2009 |
| JP | 2009-177628 | 8/2009 |
| KR | 10-2005-0104379 | 11/2005 |
| WO | 03/101132 | 12/2003 |
| WO | 2004/032371 | 4/2004 |
| WO | 2004/075423 | 9/2004 |
| WO | 2009-044223 | 4/2009 |

OTHER PUBLICATIONS

Japanese International Preliminary Report on Patentability with written Opinion of the International Searching Authority issued for corresponding International Patent Application No. PCT/JP2009/061102 with filing date of June 18, 2009 and mailing date of Jan. 26, 2012. English Translation included.

Extended European Search Report of corresponding European Patent Application 09846180.9 dated Aug. 5, 2014.

First Notification of Office Action issued by State Intellectual Property Office of China, for corresponding Chinese Patent Application 200980159885.7, dated Jul. 29, 2014. English Translation of the Office Action.

* cited by examiner

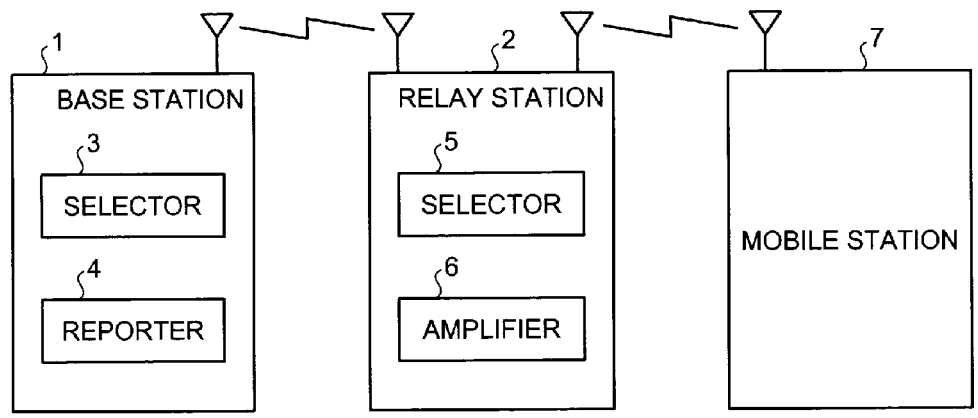
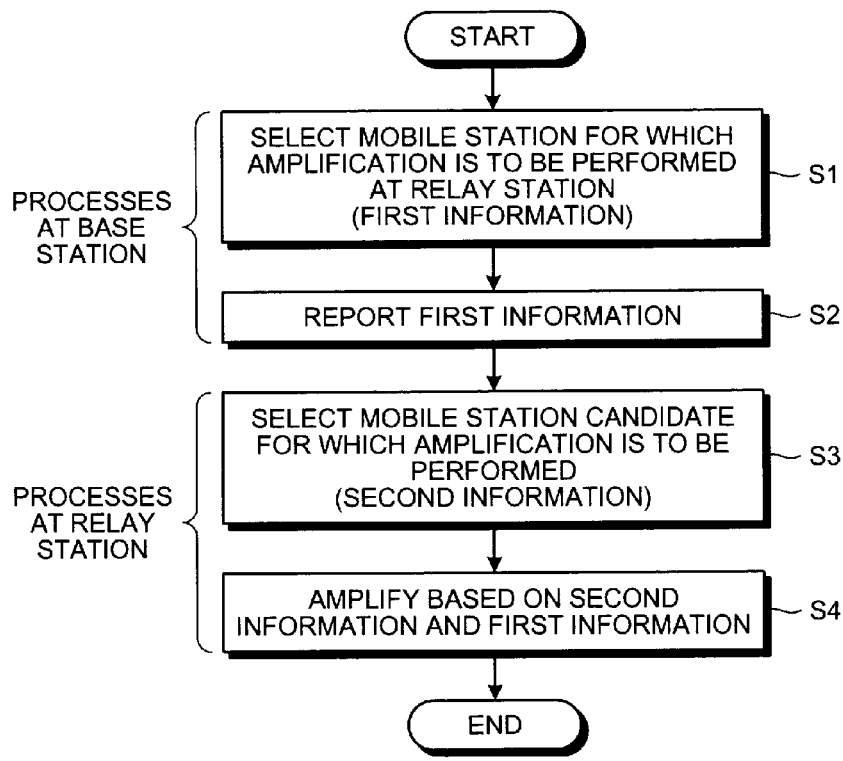

| INFORMATION CONCERNING MOBILE STATION NEAR RELAY STATION A | | INFORMATION CONCERNING MOBILE STATION NEAR RELAY STATION B | |
|---|---|---|---|
| MOBILE STATION B | SIR = 10 dB | MOBILE STATION A | SIR = 8 dB |
| MOBILE STATION C | SIR = 3 dB | MOBILE STATION B | SIR = 6 dB |
| MOBILE STATION A | SIR = 1 dB | MOBILE STATION C | SIR = 0 dB |

FIG.10

| INTERFERENCE POWER I [dBm] | NUMBER OF AMPLIFIABLE MOBILE STATIONS |
|---|---|
| $I0 \leq I < I1$ | a |
| $I1 \leq I < I2$ | b |
| $I2 \leq I < I3$ | c |
| ... | ... |

| INTERFERENCE POWER I [dBm] | GAIN FACTOR OF RELAY STATION |
|---|---|
| I0≤I<I1 | d |
| I1≤I<I2 | e |
| I2≤I<I3 | f |
| ... | ... |

| NUMBER OF MOBILE STATIONS REQUIRING AMPLIFICATION | GAIN FACTOR OF RELAY STATION |
|---|---|
| N0≤N<N1 | g |
| N1≤N<N2 | h |
| N2≤N<N3 | j |
| ... | ... |

| INTERFERENCE POWER I [dBm] | THRESHOLD USED IN JUDGING QUALITY [dB] |
|---|---|
| I0≤I<I1 | k |
| I1≤I<I2 | m |
| I2≤I<I3 | n |
| ... | ... |

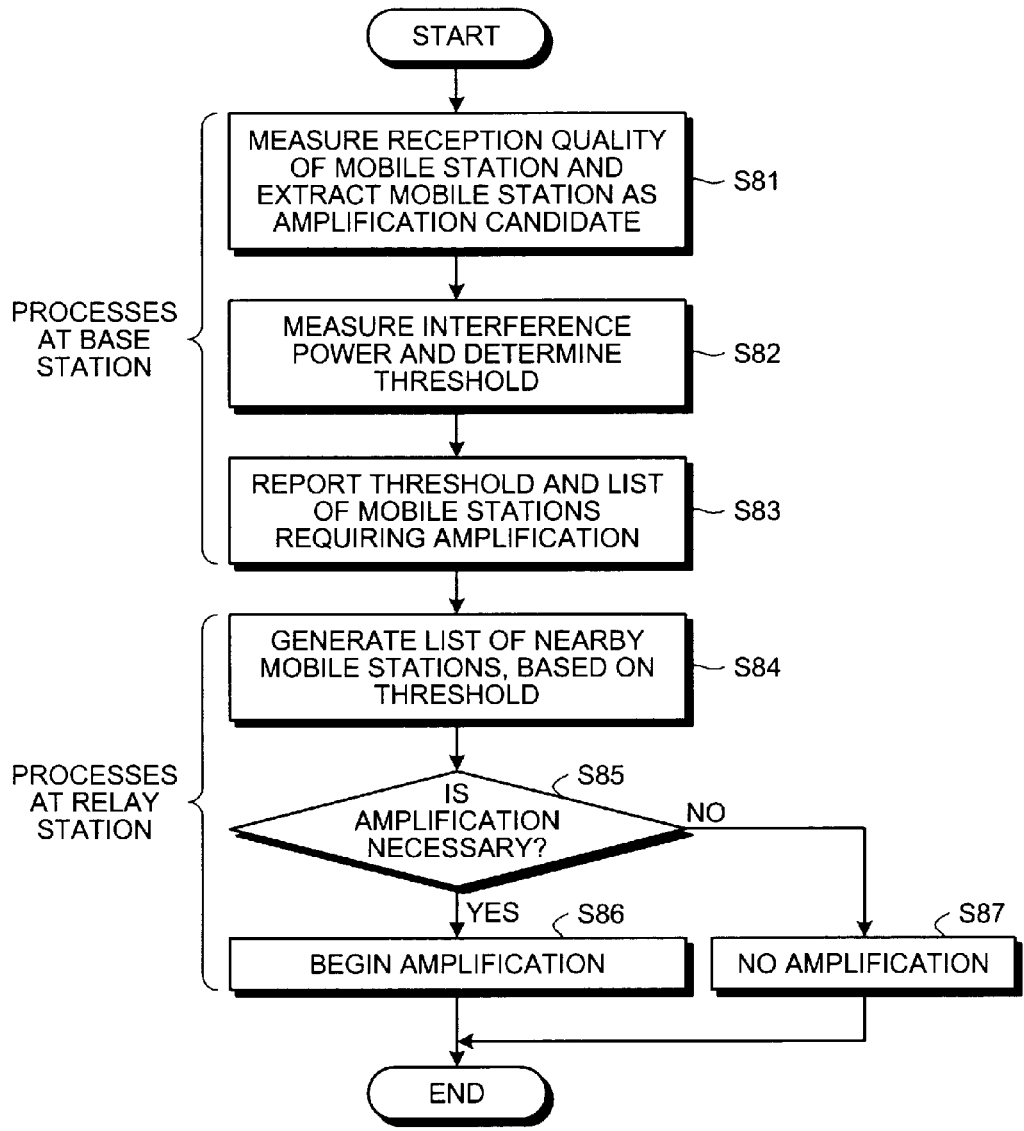

BASE STATION, RELAY STATION, WIRELESS COMMUNICATION SYSTEM, AND WIRELESS COMMUNICATION METHOD

CROSS REFERENCE TO THE RELATED APPLICATIONS

This application is a continuation application of International Application PCT/JP2009/061102, filed Jun. 18, 2009, now pending, the entire contents of which are herein wholly incorporated by reference.

FIELD

The embodiments discussed herein are related to a base station, a relay station, a wireless communication system, and a wireless communication method.

BACKGROUND

A relay station is conventionally used in wireless communication systems. Relay stations include non-regenerating types that amplify and transmit received signals, and regenerating types that amplify and transmit received signals after first decoding the signal and regenerating the original data. Among mobile communication systems, a system is known that can determine communication paths capable of realizing high speed communication by multi-hop. For example, a mobile communication system includes a communication path determining unit that based on the interference level of the signals respectively received by a relay station and a base station, which form a communication path between communicating stations, determines a communication path that offers the fastest communication speed or that satisfies a specified line quality (see, for example, International Publication Pamphlet No. 2003/101132). Further, a system is known that increases the effective area of a spread spectrum-based wireless network as well as communication capacity. For example, the system has a wireless communication network that is expanded by a low-cost, channel selector-type relay apparatus capable of relaying desired signals alone (see, for example, Published Japanese-Translation of PCT Application, Publication No. 2006-501759).

With conventional regenerating type relay stations, since signals subject to amplification can be controlled according to user, the source of interference can be controlled. However, since the decoding process takes time, regenerating type relay stations have a problem in that a greater delay occurs that with non-regenerating type relay station. Meanwhile, with conventional non-regenerating type relay stations a problem arises in that since amplification is performed at a constant gain factor, the relay station may become a source of interference.

SUMMARY

According to an aspect of an embodiment, a base station includes a selector that based on wireless communication states with each mobile station, selects a mobile station for which amplification is to be performed at a relay station; and a reporter that reports information related to the mobile station selected by the selector.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a block diagram of a configuration of a wireless communication system according to a first embodiment.
FIG. 2 is a flowchart of a wireless communication method according to the first embodiment.
FIG. 10 is a table depicting an example of a second table.
FIG. 27 is a flowchart of the wireless communication method according to the ninth embodiment.

DESCRIPTION OF EMBODIMENTS

Figure 3:
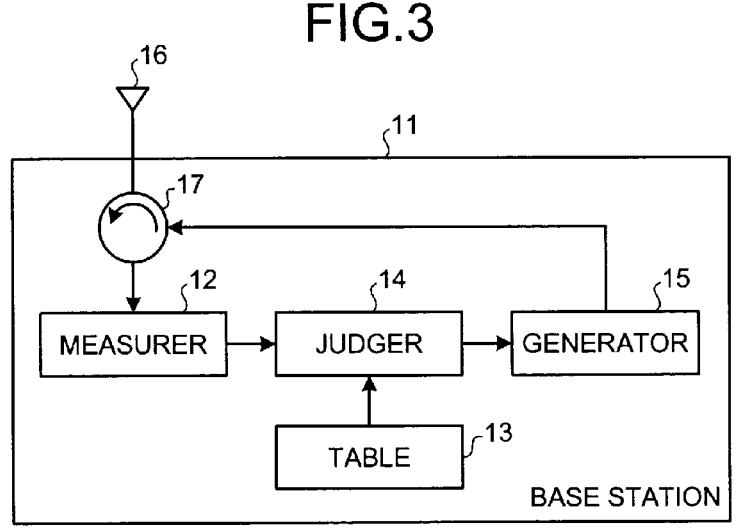
FIG. 3 is a block diagram of a configuration of a base station according to a second embodiment.

Preferred embodiments of the present invention will be explained with reference to the accompanying drawings. In the description of the embodiments, identical components are given the same reference numeral and overlapping description is omitted. Furthermore, the present invention is not limited by the following embodiments.

In a first embodiment, the base station selects based on the wireless communication state with each mobile station, a mobile station that requires amplification by the relay station; and reports first information related to the selected mobile station. The relay station selects, based on the wireless communication state with each mobile station, a mobile station candidate for which amplification is to be performed; and performs amplification, based on second information related to the selected mobile station candidate and the first information reported by the base station.

FIG. 1 is a block diagram of a configuration of the wireless communication system according to the first embodiment. As depicted in FIG. 1, the wireless communication system includes a base station 1 and a relay station 2. The base station 1 includes a selector 3 and a reporter 4. The selector 3 selects based on the wireless communication state between the base station 1 and a mobile station 7, a mobile station for which amplification is to be performed at the relay station 2. The reporter 4 reports first information related to the mobile station selected by the selector 3. The relay station 2 includes a selector 5 and an amplifier 6. The selector 5 of the relay station 2 selects based on the wireless communication state between the relay station 2 and the mobile station 7, a mobile station candidate for which amplification is to be performed. The amplifier 6 performs amplification, based on second information related to the mobile station candidate selected by the selector 5 of the relay station 2 and the first information reported by the base station 1. The number of the relay stations 2 and/or the number of the mobile stations 7 may be plural.

FIG. 2 is a flowchart of the wireless communication method according to the first embodiment. As depicted in FIG. 2, when a process begins for determining whether amplification is to be performed during wireless communication between a base station and a mobile station, the base station selects based on the wireless communication state with the mobile station, a mobile station for which amplification is to be performed at the relay station (step S1). The base station reports information (first information) related to the mobile station selected at step S1 (step S2). Meanwhile, the relay station selects based on the wireless communication state with the mobile station, a mobile station candidate for which amplification is to be performed (step S3). The relay station performs amplification, based on information (second information) related to the mobile station candidate selected at step S3 and the first information reported by the base station at step S2 (step S4). In this series of processes, step S1 and step S2 are executed in this sequence. Step S4 is executed after steps S1, S2, and S3. The execution timing of step S3 may be after step S2, before step S2, or before step S1.

According to the first embodiment, the relay station performs amplification based on information concerning a mobile station that has been selected by the base station, for amplification, and information concerning a mobile station that is regarded as a candidate for amplification by the relay station, thereby enabling configuration to be such that the relay station does not perform amplification when the mobile station regarded as the candidate for amplification by the relay station is not included in the information concerning the mobile station that has been selected by the base station, for amplification. If the radio wave environment around the relay station changes while the relay station is performing amplification and the mobile station that is regarded as the candidate for amplification by the relay station is no longer included in the information concerning the mobile station selected by the base station, the relay station can terminate the amplification. Consequently, the phenomenon of the relay station becoming a source of interference, consequent to the relay station performing amplification when amplification is not necessary, can be prevented. When the base station selects plural mobile stations to be subject to amplification and plural relay stations are present, the respective relay stations perform amplification if the amplification candidate thereof is included in the information concerning the mobile stations selected by the base station. Consequently, the mobile stations requiring amplification are distributed among the relay stations, enabling amplification to be performed efficiently.

FIG. 3 is a block diagram of a configuration of the base station according to a second embodiment. As depicted in FIG. 3, a base station 11 includes a measurer 12, a table 13, a judger 14, and a generator 15. Via an antenna 16 and a switch 17, the base station 11 receives a wireless signal transmitted from a non-depicted mobile station. The measurer 12 measures the wireless communication state between the base station 11 and the mobile station. Reception quality (signal to interference power ratio (SIR)) is one example of a wireless communication state. In this case, for example, the measurer 12 measures the reception quality (SIR) of a common pilot channel between the base station and the mobile station. The table 13 stores thresholds used when the wireless communication state is judged.

The judger 14 compares the wireless communication state and a threshold. The judger 14, for example, judges that amplification is not necessary for a mobile station for which the wireless communication state exceeds or is equal to the threshold. The wireless signal between the base station and a mobile station, for which amplification is judged to be not necessary, is not amplified at a relay station (not depicted). The judger 14, for example, judges that amplification is necessary for a mobile station for which the wireless communication state is less than the threshold. The wireless signal between the base station and a mobile station for which amplification is judged to be necessary is amplified at a non-depicted relay station. The generator 15 generates a list of mobile stations for which amplification has been judged to be necessary. The base station 11 reports (broadcasts), via the switch 17 and the antenna 16, the list of mobile stations for which amplification has been judged necessary.

The antenna 16, the switch 17, the measurer 12, the table 13, and the judger 14, for example, operate as the selector 3 of the base station 1 in the first embodiment. The generator 15, the switch 17, and the antenna 16, for example, operate as the reporter 4 in the first embodiment. The list of mobile stations for which amplification has been judged to be necessary is one example of the first information in the first embodiment.

Figure 4:
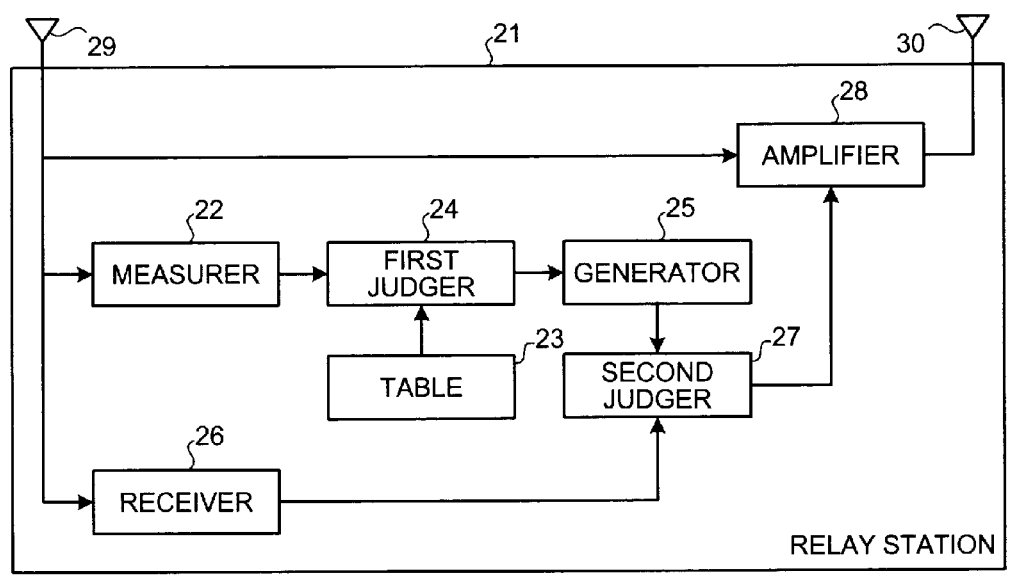
FIG. 4 is a block diagram of a configuration of a relay station according to the second embodiment.

FIG. 4 is a block diagram of a configuration of the relay station according to the second embodiment. As depicted in FIG. 4, a relay station 21 is a non-regenerating type relay apparatus, for example. The relay station 21 includes a measurer 22, a table 23, a first judger 24, a generator 25, a receiver 26, a second judger 27, and an amplifier 28. Via an antenna 29, the relay station 21 receives a wireless signal transmitted from a non-depicted base station or mobile station. The measurer 22 measures the wireless communication state between the relay station 21 and the mobile station. An example of the wireless communication state is reception quality (SIR). In this case, for example, the measurer 22 measures the reception quality (SIR) of a common pilot channel between the base station and the mobile station. The table 23 stores thresholds used when the wireless communication state is judged.

The first judger 24 compares the wireless communication state and a threshold. In general, the nearer the mobile station is to the relay station 21, the better the wireless communication state. The first judger 24, for example, judges a mobile station to be nearby if the wireless communication state thereof exceeds the threshold. A mobile station judged to be nearby is a mobile station candidate for which amplification is to be performed by the relay station 21. The first judger 24, for example, judges a mobile station to not be nearby if the wireless communication state thereof is less than or equal to the threshold. A mobile station judged to not be nearby is not a mobile station candidate for which amplification is to be performed by the relay station 21. The generator 25 generates a list of mobile station candidates for which amplification is to be performed by the relay station 21. The receiver 26 receives and stores the list of mobile stations reported and judged by the base station to require amplification.

The second judger 27 judges whether to perform amplification at the relay station 21, based on the list of mobile station candidates for which amplification is to be performed and the list of mobile stations judged to require amplification. For example, the second judger 27 judges that amplification is to be performed by the relay station 21, when one or more of the mobile stations included on the list of mobile station candidates for which amplification is to be performed at the relay station 21 is included on the list of mobile stations judged to require amplification. The amplifier 28 switches between states of performing amplification operations and not performing amplification operations, based on the judgment results of the second judger 27. When amplification operations are performed by the amplifier 28, a received signal is amplified by the amplifier 28 and the amplified signal is transmitted via an antenna 30.

The antenna 29, the measurer 22, the table 23, and the first judger 24, for example, operate as the selector 5 of the relay station 2 in the first embodiment. The generator 25, the receiver 26, the second judger 27, and the amplifier 28, for example, operate as the amplifier 6 in the first embodiment. The list of mobile station candidates for which the relay station 21 is to perform amplification is an example of the second information in the first embodiment.

Figure 5:
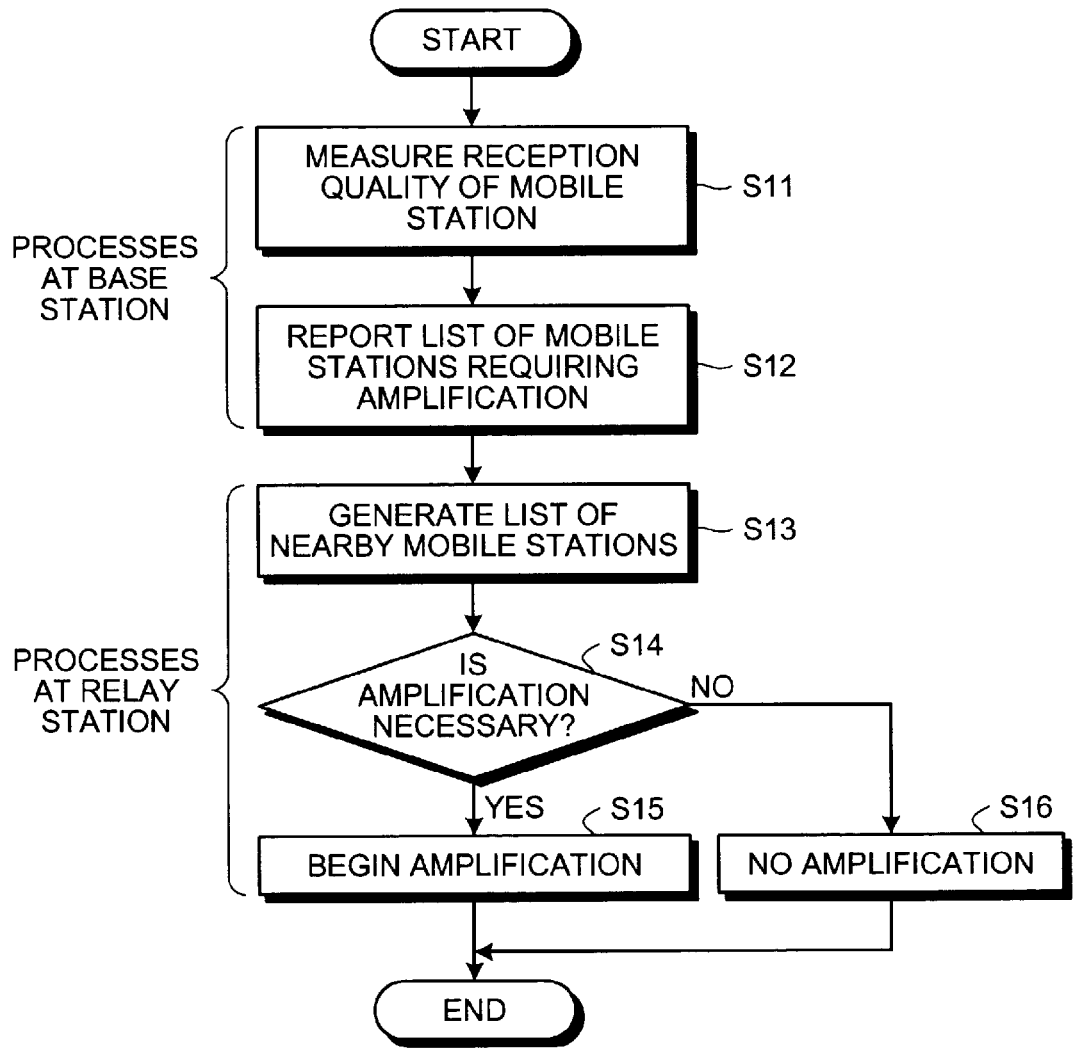
FIG. 5 is a flowchart of the wireless communication method according to the second embodiment.

FIG. 5 is a flowchart of the wireless communication method according to the second embodiment. As depicted in FIG. 5, when a process begins for determining whether amplification is to be performed during wireless communication between a base station and a mobile station, the relay station is in a state of not performing amplification and base station measures the wireless communication state between the base station and the mobile station (step S11). For example, the base station measures the reception quality (SIR) of a common pilot channel between the base station and the mobile station. The base station compares the wireless communication state and a preliminarily set threshold, and for example, judges that amplification is necessary for a mobile station for which the wireless communication state does not exceed the threshold. The base station generates a list of mobile stations requiring amplification and reports the list (step S12).

Meanwhile the relay station measures the wireless communication state between the relay station and the mobile station. For example, the relay station measures the reception quality (SIR) of a common pilot channel between the base station and the mobile station. The relay station compares the wireless communication state and a preliminarily set threshold and for example, judges a mobile station to be nearby if the wireless communication state thereof exceeds the threshold. The relay station generates a list of mobile stations that have been judged to be nearby (a nearby-mobile-station list) (step S13). The relay station checks whether the mobile stations judged to be nearby are included on the list of mobile stations reported and judged by the base station to require amplification. The relay station judges that amplification is necessary if the mobile stations judged to be nearby are included on the list of mobile stations judged to require amplification, whereas if the mobile stations are not included, the relay station judges that amplification is not necessary (step S14). If the judgment result is that amplification is necessary (step S14: YES), the relay station begins amplification (step S15). If amplification is judged to not be necessary (step S14: NO), the relay station remains in a state of not performing amplification (step S16).

The base station continuously measures the wireless communication state between the base station and the mobile stations, generates a list of mobile stations requiring amplification, and reports the list. The relay station continuously measures the wireless communication state between the relay station and the mobile stations, and generates a list of mobile stations judged to be nearby. In other words, the list of mobile stations judged at the base station, to require amplification and the list of mobile stations judged at the relay station, to be nearby dynamically change. The relay station terminates amplification when the mobile station judged to be nearby ceases to be included on the list of mobile stations judged to require amplification. When there are plural relay stations within transmission range of the base station, such as in a cell or sector created by the base station, steps S13 to S16 are executed at each relay station. In this series of processes, steps S11 and S12 are executed in this sequence. Step S14 is executed after steps S11, S12, and S13. The execution timing of step S13 may be after step S12, before step S12, or before step S11.

According to the second embodiment, effects identical to those of the first embodiment are obtained. If the same mobile station is included in the nearby-mobile-station list of plural relay stations, amplification for the mobile station may be performed by the plural relay stations. Further, a regenerating type relay station may be used as the relay station.

A third embodiment incorporates into the second embodiment, a sharing of the nearby-mobile-station lists among the relay stations. Configuration of the base station in the third embodiment is identical to that in the second embodiment. Configuration of the relay station in third embodiment is as depicted in FIG. 6, for example.

Figure 6:
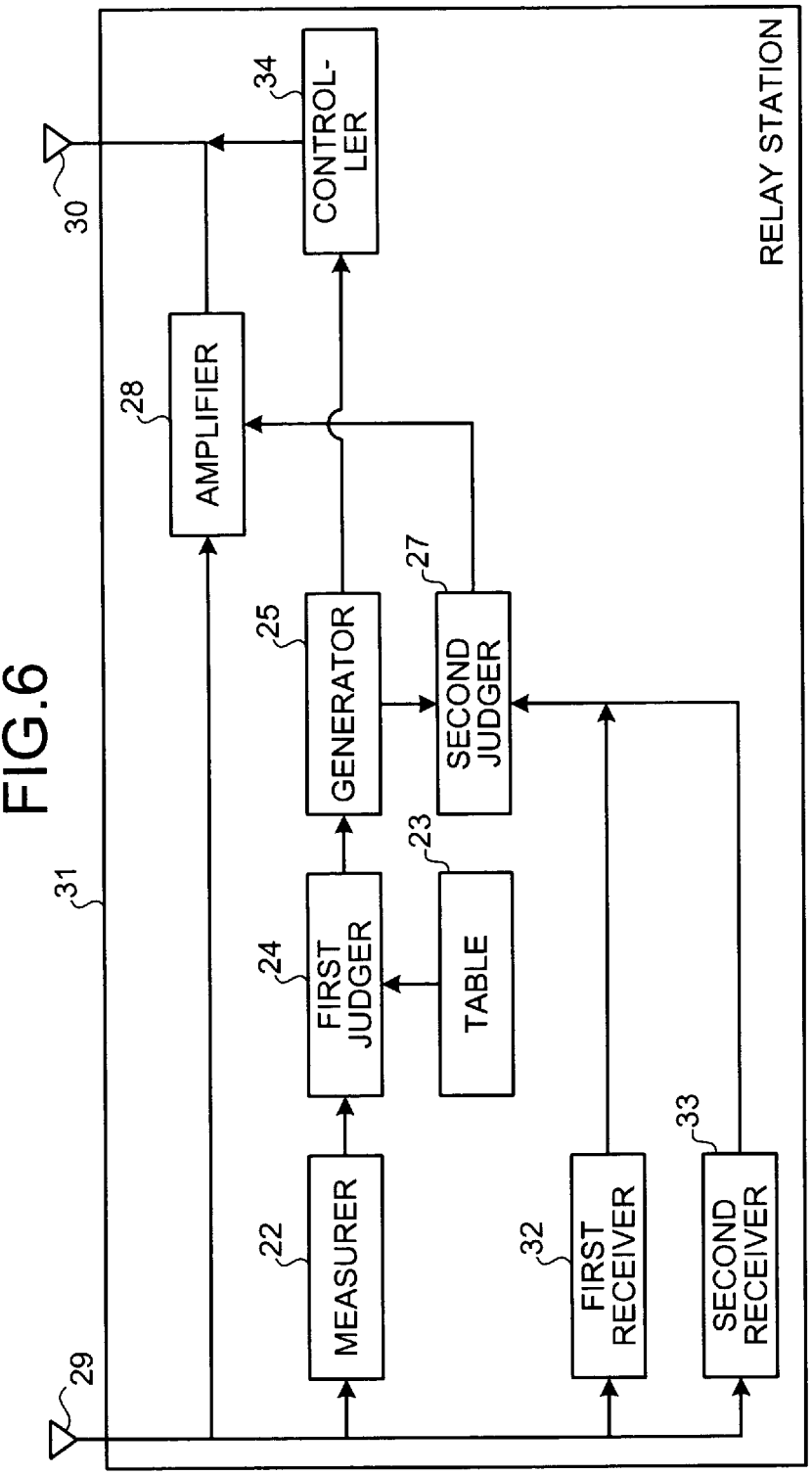
FIG. 6 is a block diagram of a configuration of the relay station according to a third embodiment.

FIG. 6 is a block diagram of a configuration of the relay station according to the third embodiment. As depicted in FIG. 6, a relay station 31 includes a first receiver 32, a second receiver 33, a controller 34, the measurer 22, the table 23, the first judger 24, the generator 25, the second judger 27, and the amplifier 28. The first receiver 32 is identical to the receiver 26 of the second embodiment. The second receiver 33 receives and stores the nearby-mobile-station lists from other relay stations. The controller 34 generates a wireless channel for transmitting the nearby-mobile-station list of the relay station 31 to other relay stations. The controller 34 controls the wireless channel and transmits the nearby-mobile-station list of the relay station 31 to other relay stations, via the antenna 30.

The second judger 27 judges whether amplification at the relay station 31 is to be performed, based on the list of mobile station candidates for which amplification is to be performed at the relay station 31, the list of mobile stations judged to require amplification, and the nearby-mobile-station lists of other relay stations. For example, when the following two conditions are satisfied, the second judger 27 judges that amplification at the relay station 31 is to be performed. A first condition is that one or more mobile stations included on the list of mobile station candidates for which amplification is to be performed at the relay station 31, is included on the list of mobile stations judged to require amplification. A second condition is that a mobile station that is included in both the list of mobile station candidates for which amplification is to be performed at the relay station 31 and the list of mobile stations judged to require amplification, is located nearer to the relay station 31 than to other relay stations. The second judger 27 judges that amplification is not to be performed by the relay station 31, when none of the mobile stations included on the list of mobile station candidates for which amplification is to be performed at the relay station 31 are included on the list of mobile stations judged to require amplification, or when the first condition is satisfied, but the second condition is not. Other aspects of the relay station 31 are identical to the second embodiment.

Figure 7:
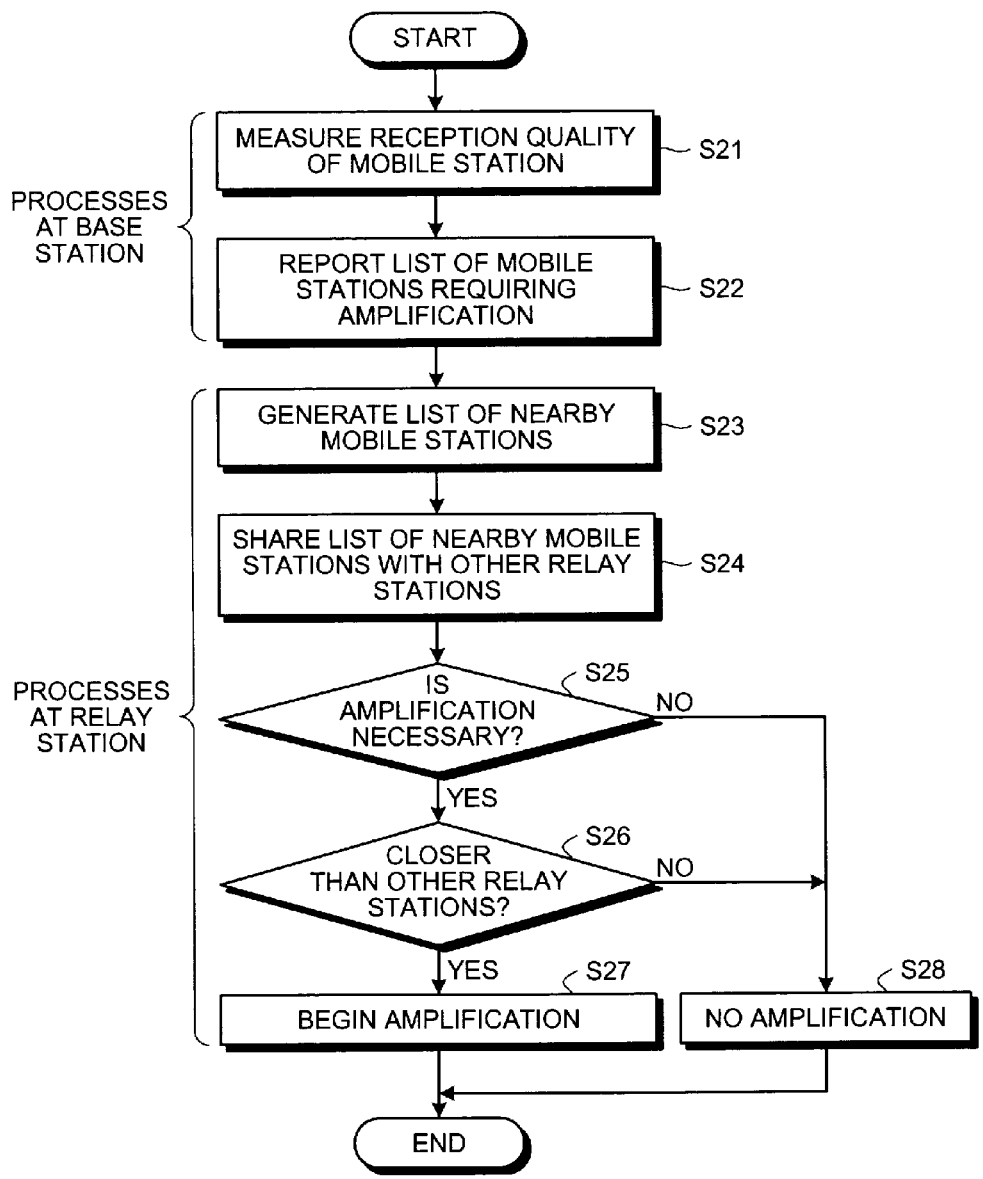
FIG. 7 is a flowchart of the wireless communication method according to the third embodiment.

FIG. 7 is a flowchart of the wireless communication method according to the third embodiment. As depicted in FIG. 7, when the processes begin, similar to steps S11 to S13 in the second embodiment, the base station measures the wireless communication state between the base station and the mobile station (step S21), generates a list of mobile station that have been judged to require amplification, and reports the list (step S22). Meanwhile, each relay station generates a list of nearby mobile stations (step S23). The relay stations transmit and receive the lists of nearby mobile stations with one another and thereby share the lists (step S24).

Similar to step S14 of the first embodiment, each relay station, judges whether amplification is necessary (step S25). If the judgment result is that amplification is necessary (step S25: YES), the relay station judges whether a mobile station that is included in both the list of mobile station candidates for which amplification is to be performed by the relay station and the list of mobile stations judged to require amplification, is located nearer to the relay station than to other relay stations (step S26). If so (step S26: YES), the relay station begins amplification (step S27). At step S25, if amplification is not necessary (step S25: NO), or at step S26, if the mobile station is nearer to another relay station (step S26: NO), the relay station remains in a state of not performing amplification (step S28). In this series of processes, the execution timing of step S23 may be after step S22, before step S22, or before step S21.

Figures 8, 9:
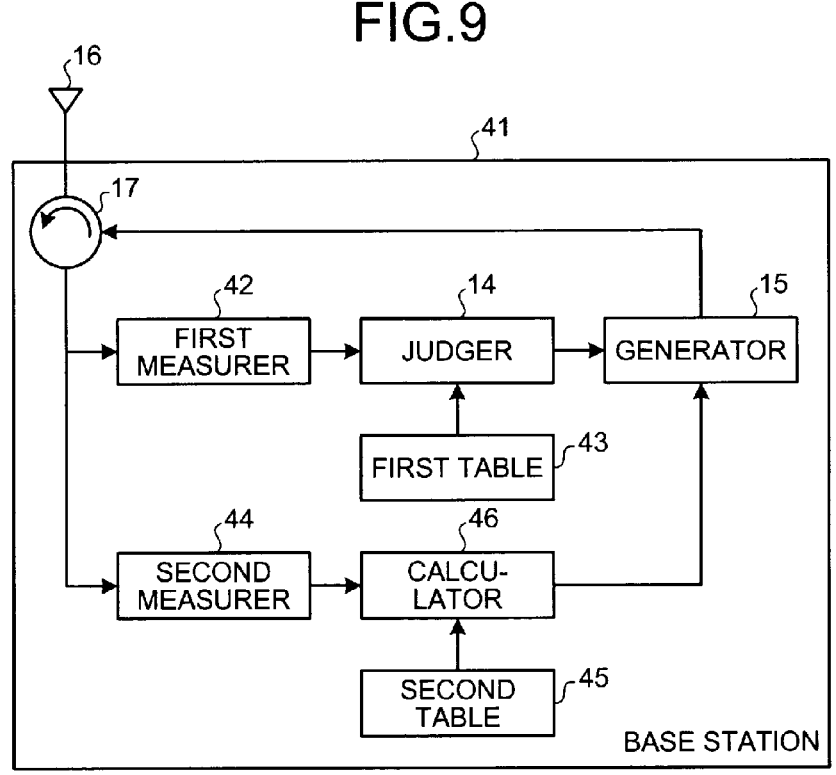
FIG. 8 is a diagram of an example of wireless communication states between the relay station and the mobile station in the third embodiment.
FIG. 9 is a block diagram of a configuration of the base station according to a fourth embodiment.

FIG. 8 is a diagram of an example of wireless communication states between the relay station and the mobile station in the third embodiment. For example, the wireless communication system is assumed to include relay station A and relay station B in addition to the base station, where mobile station A, mobile station B, and mobile station C are located in a vicinity of relay station A and relay station B. At each relay station, the wireless communication state (reception quality, SIR) of each mobile station is assumed to be as depicted in table 35 in FIG. 8. At each relay station, the threshold when judging whether a mobile station is nearby, is assumed to be 5 dB. In this example, for relay station A, mobile station B is included on the list of mobile stations that have been judge to be nearby. For relay station B, mobile station B and mobile station A are included on the list of mobile stations that have been judged to be nearby. Mobile station B is assumed to be included on the list of mobile stations that have been reported and judged by the base station to require amplification. According to FIG. 8, the reception quality of mobile station B is better for relay station A than for relay station B and accordingly, at step S26 in the flowchart depicted in FIG. 7, mobile station B is judged to be located nearer to relay station A than to relay station B. Therefore, relay station A begins amplification (step S27), and relay station B remains in a state of not performing amplification (step S28). At relay station B, although the reception quality of mobile station A is favorable, for example, if mobile station A is not included in the list of mobile stations reported and judged by the base station to require amplification, the judgment of whether amplification is necessary is not performed with respect to mobile station A.

According to the third embodiment, effects identical to those of the first embodiment are obtained. Further, configuration may be such that a relay station transmits the list of nearby mobile stations to another relay station by a wired line.

A fourth embodiment incorporates into the second embodiment, a changing of the number of mobile stations judged to require amplification, based on interference power within the cell. The configuration of the base station in the fourth embodiment is, for example, as depicted in FIG. 9. The configuration of the relay station in the fourth embodiment is identical to that in the second embodiment.

FIG. 9 is a block diagram of a configuration of the base station according to the fourth embodiment. FIG. 10 is a table depicting an example of a second table. As depicted in FIG. 9, a base station 41 includes a first measurer 42, a first table 43, a second measurer 44, a second table 45, a calculator 46, the judger 14, the generator 15, and the switch 17. The first measurer 42 and the first table 43 are respectively identical to the measurer 12 and the table 13 of the second embodiment. The second measurer 44 measures the interference power within the cell. The second table 45 stores correspondence relations between the interference power within the cell and the number of amplifiable mobile stations (see FIG. 10). Correspondence relations between the interference power within the cell and the number of amplifiable mobile stations may be preliminarily determined by simulation using a computing device, for example. The calculator 46 determines the number of mobile stations that can be amplified, based on the correspondence relation between the interference power within the cell and the number of amplifiable mobile stations, and the interference power within the cell. Using the number of amplifiable mobile stations as an upper limit, the generator 15 generates a list of mobile stations judged to require amplification. Other aspects of the base station 41 are identical to the second embodiment. In FIG. 10, I0, I1, I2, and I3 are numerical values indicating interference power and the relative magnitudes thereof, for example, are I0<I1<I2<I3. Further, a, b, and c are integers 0 or greater indicating the number of mobile stations and the relative magnitudes thereof, for example, are a>b>c.

Figure 11:
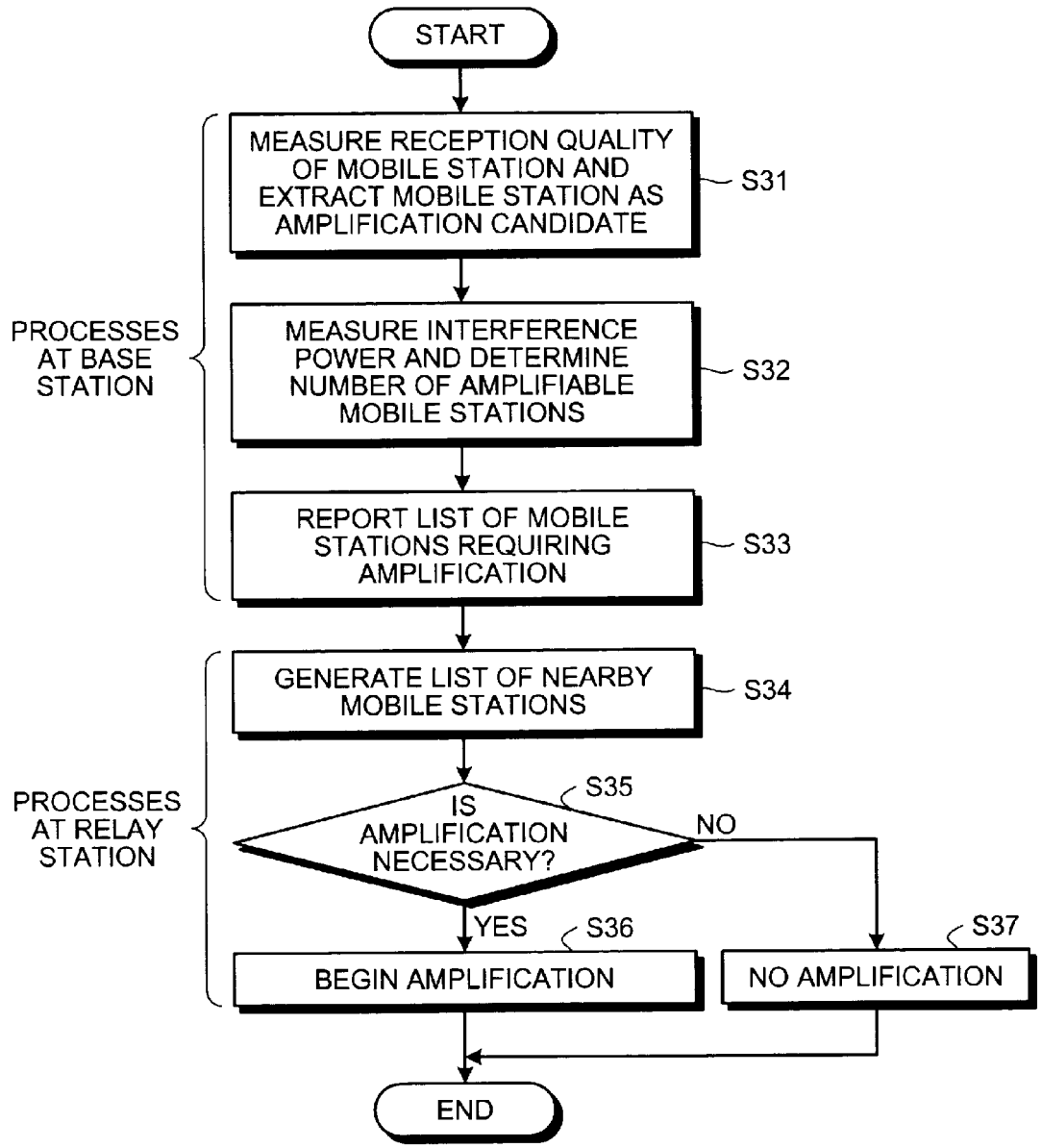
FIG. 11 is a flowchart of the wireless communication method according to the fourth embodiment.

FIG. 11 is a flowchart of the wireless communication method according to the fourth embodiment. As depicted in FIG. 11, when the processes begin, the base station measures the wireless communication state between the base station and each mobile station. The base station compares each wireless communication state with a preliminarily set threshold, and for example, as a mobile station candidate for which amplification is to be performed at a relay station, extracts a mobile station for which the wireless communication state does not exceed the threshold (step S31). The base station measures the interference power within the cell and based on a preliminarily set correspondence relation, determines the number of amplifiable mobile stations corresponding to the interference power in within the cell (step S32). Using the number of amplifiable mobile stations as an upper limit, the base station extracts, for example, in descending order of poor wireless communication state and from among the mobile station candidates to be amplified at a relay station, mobile stations requiring amplification. The base station generates and reports a list of mobile stations requiring amplification (step S33).

Meanwhile, each relay station, as at steps S13 to S16 in the second embodiment, after generating a list of nearby mobile stations (step S34), judges whether amplification is necessary (step S35). Based on the judgment results, the relay station begins amplification (step S36), or remains in a state of not performing amplification (step S37). In this series of processes, step S32 may be executed prior to step S31. The execution timing of step S34 may be after step S33, before step S33, before step S32, or before step S31.

According to the fourth embodiment, effects identical to those of the first embodiment are obtained. Further, control that takes interference power in the cell into consideration become possible where the number of mobile stations for which amplification is to be performed at the relay station is reduced when the interference power within the cell is great, and the number of mobile stations for which amplification is to be performed at the relay station is increased when the interference power within the cell is low. In the fourth embodiment, configuration may be such that as in the third embodiment, the list of nearby mobile stations is shared with other relay stations.

Figures 12, 13:
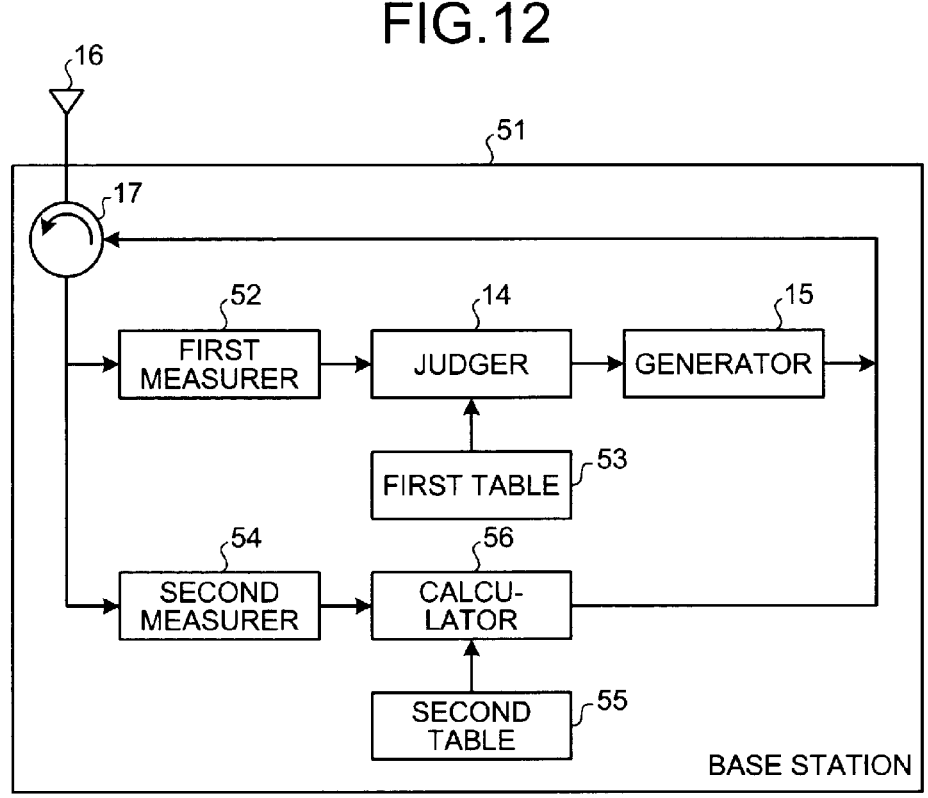
FIG. 12 is a block diagram of a configuration of the base station according to a fifth embodiment.
FIG. 13 is a table depicting an example of the second table.

A fifth embodiment incorporates into the second embodiment, a changing of the gain factor at the relay station, based on interference power within the cell. Configuration of the base station in the fifth embodiment is, for example, as depicted in FIG. 12. Configuration of the relay station in the fifth embodiment is, for example, as depicted in FIG. 14.

FIG. 12 is a block diagram of a configuration of the base station according to the fifth embodiment. FIG. 13 is a table depicting an example of the second table. As depicted in FIG. 12, a base station 51 includes a first measurer 52, a first table 53, a second measurer 54, a second table 55, a calculator 56, the judger 14, the generator 15, and the switch 17. The first measurer 52 and the first table 53 are respectively identical to the measurer 12 and the table 13 of the second embodiment. The second measurer 54 measures the interference power within the cell. The second table 55 stores correspondence relations between the interference power within the cell and gain factor (see FIG. 13). Correspondence relations between interference power within the cell and gain factor may be preliminarily determined by simulation using a computing device, for example. The calculator 56 determines the gain factor, based on the correspondence relation between the interference power within the cell and gain factor, and the interference power within the cell. Via the switch 17 and the antenna 16, gain factor information is reported, together with the list of mobile stations that have been judged to require amplification. Other aspects of the base station 51 are identical to the second embodiment. In FIG. 13, I0, I1, I2, and I3 are numerical values indicating interference power and the relative magnitudes thereof, for example, are I0<I1<I2<I3. Further, d, e, and f are numerical values indicating gain factors and the relative magnitudes thereof, for example, are d>e>f.

Figure 14:
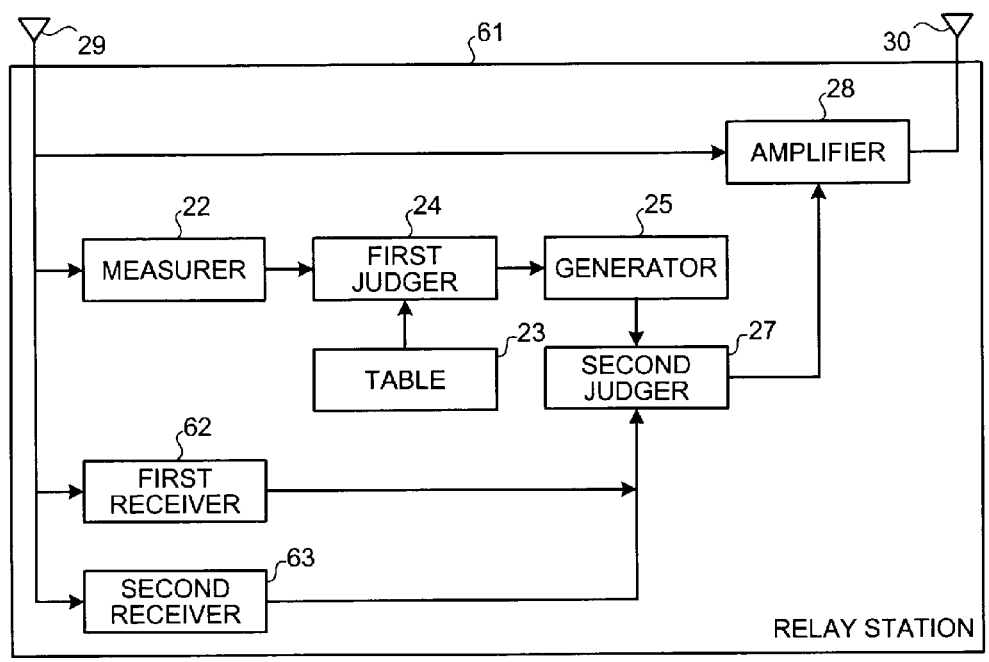
FIG. 14 is a block diagram of the relay station according to the fifth embodiment.

FIG. 14 is a block diagram of the relay station according to the fifth embodiment. As depicted in FIG. 14, a relay station 61 includes a first receiver 62, a second receiver 63, the measurer 22, the table 23, the first judger 24, the generator 25, the second judger 27, and the amplifier 28. The first receiver 62 is identical to the receiver 26 of the second embodiment. The second receiver 63 receives and stores gain factor information reported by the base station. The second judger 27 controls the gain factor, based on the gain factor information reported by the base station, when amplification is judged to be performed. Other aspects of the relay station 61 are identical to the second embodiment.

Figure 15:
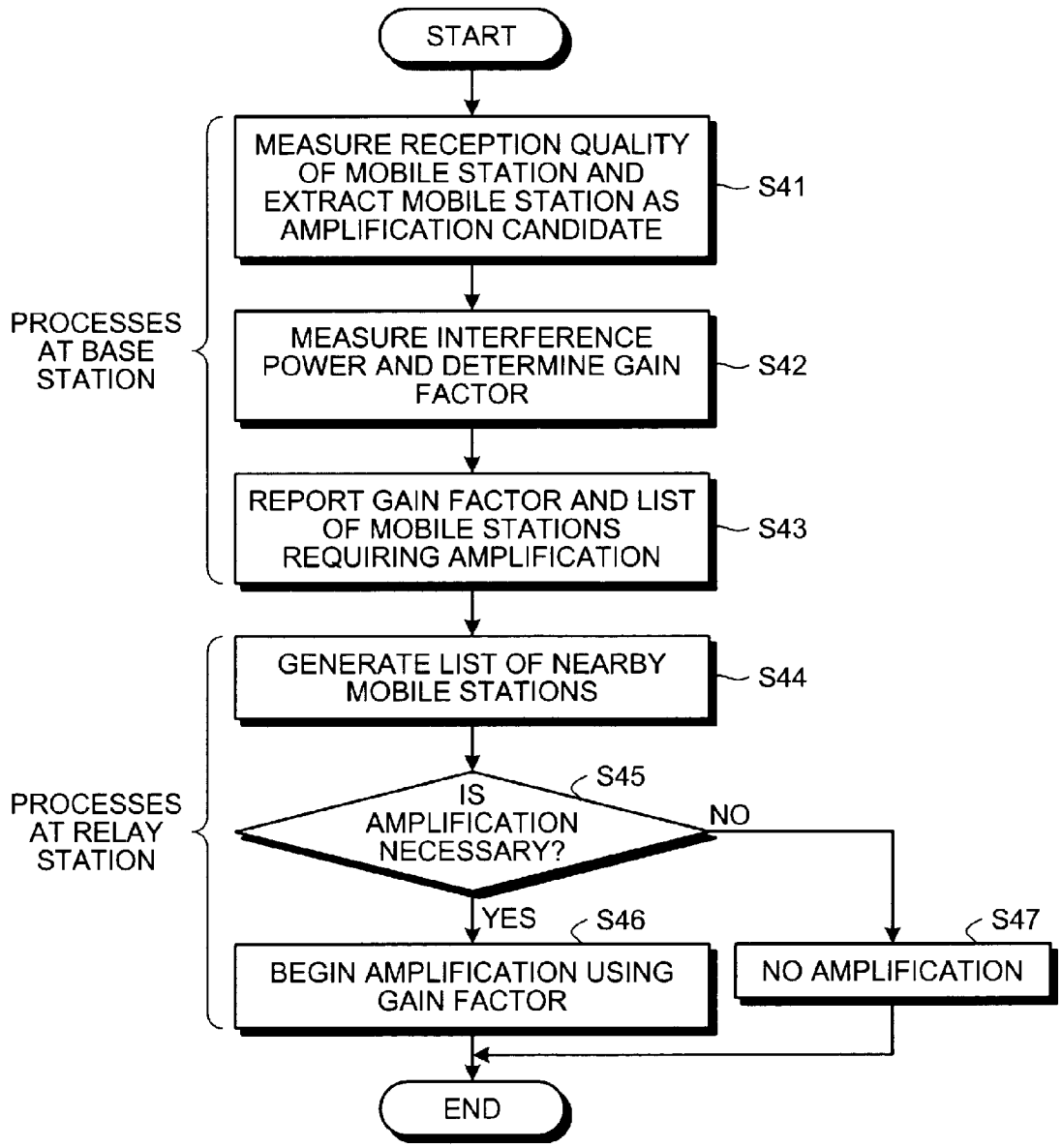
FIG. 15 is a flowchart of the wireless communication method according to the fifth embodiment.

FIG. 15 is a flowchart of the wireless communication method according to the fifth embodiment. As depicted in FIG. 15, when the processes begin, the base station measures the wireless communication state between the base station and each mobile station. The base station compares each wireless communication state with a preliminarily set threshold, and for example, as a mobile station candidate for which amplification is to be performed at a relay station, extracts a mobile station for which the wireless communication state does not exceed the threshold (step S41). The base station measures the interference power within the cell and based on a preliminarily set correspondence relation, determines the gain factor corresponding to the interference power within the cell (step S42). The base station generates based on mobile station candidates for which amplification is to be performed at a relay station, a list of mobile stations requiring amplification, and reports the list and the gain factor (step S43).

Meanwhile, each relay station, as at steps S13 to S16 in the second embodiment, after generating the list of nearby mobile stations (step S44), judges whether amplification is necessary (step S45). Based on the judgment results, the relay station begins amplification (step S46), or remains in a state of not performing amplification (step S47). If the relay station begins amplification, the relay station uses the gain factor reported by the base station. In this series of processes, step S42 may be executed prior to step S41. The execution timing of step S44 may be after step S43, before step S43, before step S42, or before step S41.

According to the fifth embodiment, effects identical to those of the first embodiment are obtained. Further, control that takes interference power within the cell into consideration becomes possible where the gain factor is reduced when the interference power within the cell is great, and the gain factor is increased when the interference power within the cell is low. In the fifth embodiment, configuration may be such that as in the third embodiment, the list of nearby mobile stations is shared with other relay stations.

Figures 16, 17:
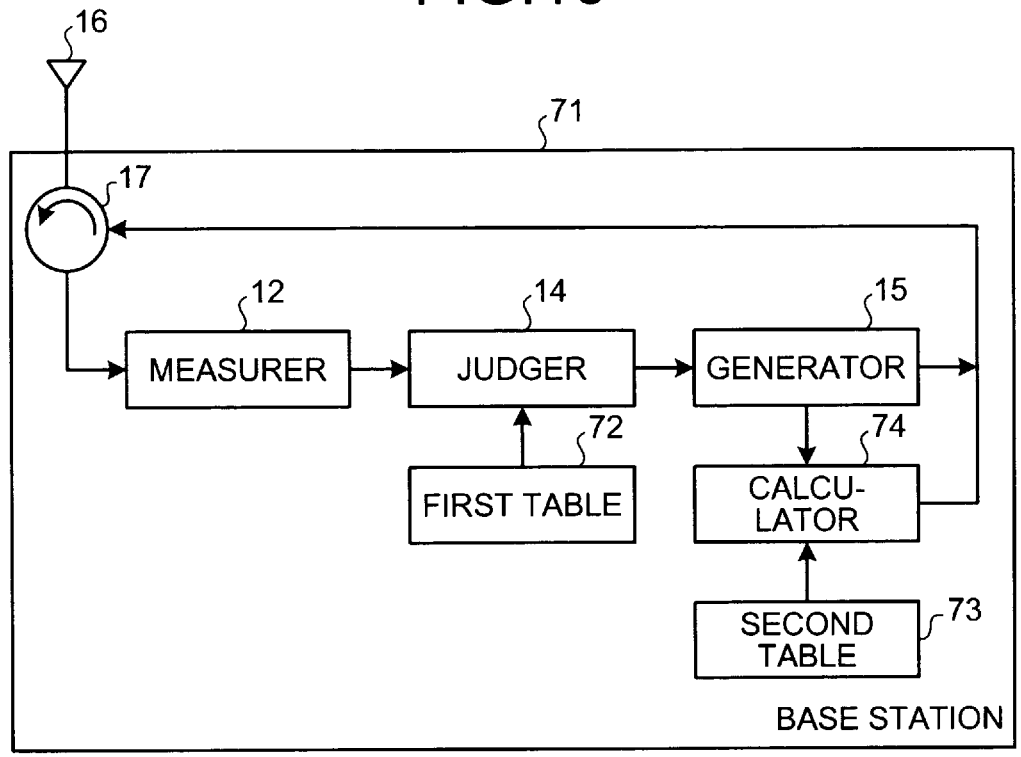
FIG. 16 is a block diagram of the base station according to a sixth embodiment.
FIG. 17 is a diagram depicting an example of the second table.

A sixth embodiment incorporates into the second embodiment, a changing of the gain factor at a relay station, based on the number of mobile stations that require amplification. Configuration of the base station in the sixth embodiment is, for example, as depicted in FIG. 16. Configuration of the relay station in the sixth embodiment is identical to the fifth embodiment.

FIG. 16 is a block diagram of the base station according to the sixth embodiment. FIG. 17 is a diagram depicting an example of the second table. As depicted in FIG. 16, a base station 71 includes a first table 72, a second table 73, a calculator 74, the measurer 12, the judger 14, the generator 15, and the switch 17. The first table 72 is identical to the table 13 of the second embodiment. The second table 73 stores correspondence relations between the number of mobile stations requiring amplification and the gain factor (see FIG. 17). Correspondence relations between the number of mobile stations requiring amplification and the gain factor may be preliminarily determined by simulation using a computing device, for example. The calculator 74 determines the gain factor, based on the correspondence relations between the number of mobile stations requiring amplification and the gain factor, and the number of mobile stations requiring amplification. Via the switch 17 and the antenna 16, gain factor information is reported, together with the list of mobile stations judged to require amplification. The generator 15 reports to the calculator 74, the number of mobile stations that require amplification. Other aspects of the base station 71 are identical to the second embodiment. In FIG. 17, N0, N1, N2, and N3 are number of mobile stations requiring amplification and the relative magnitude thereof, for example, are N0<N1<N2<N3. Further, g, h, and j are numerical values indicating the gain factor and relative magnitudes thereof, for example, are g>h>j.

Figure 18:
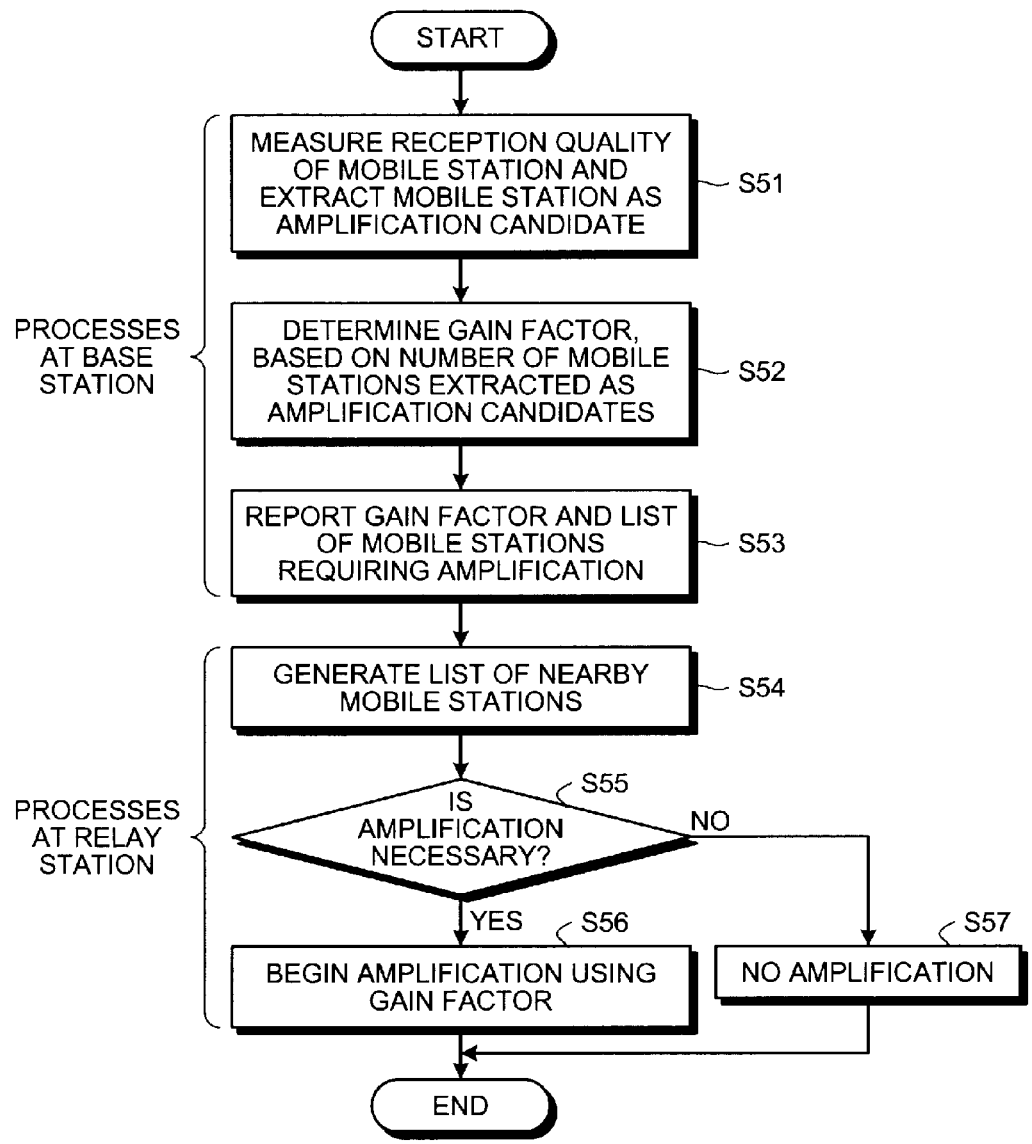
FIG. 18 is a flowchart of the wireless communication method according to the sixth embodiment.

FIG. 18 is a flowchart of the wireless communication method according to the sixth embodiment. As depicted in FIG. 18, when the processes begin, the base station measures the wireless communication state between the base station and each mobile station. The base station compares each wireless communication state with a preliminarily set threshold, and for example, as a mobile station candidate for which amplification is to be performed at a relay station, extracts a mobile station for which the wireless communication state does not exceed the threshold (step S51). Based on a preliminarily set correspondence relation, the base station determines the gain factor corresponding to the number of mobile stations requiring amplification (step S52). The processes hereinafter are identical to steps S43 to S47 in the fifth embodiment (steps S53 to S57). In this series of processes, the execution timing of step S54 may be after step S53, before step S53, before step S52, or before step S51.

According to the sixth embodiment, effects identical to those of the first embodiment are obtained. Further, control that takes the number of mobile stations requiring amplification into consideration becomes possible where the gain factor is reduced when the number of mobile stations requiring amplification is large and the gain factor is increased when the number of mobile stations requiring amplification is small. In the sixth embodiment, configuration may be such that as in the third embodiment, the list of nearby mobile stations is shared with other relay stations.

Figures 19, 20:
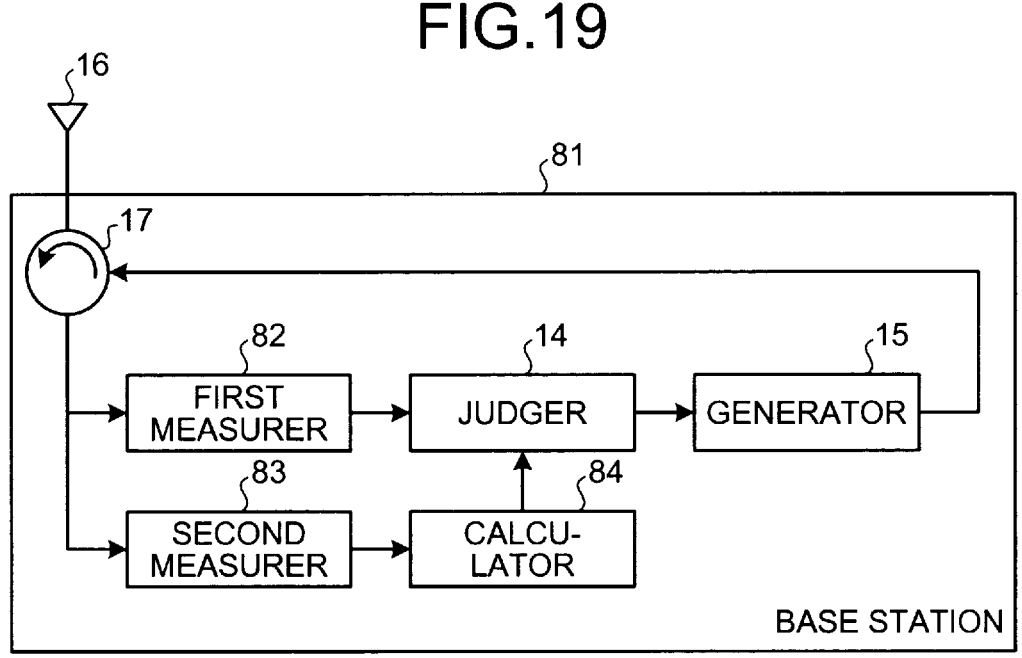
FIG. 19 is a block diagram of the base station according to a seventh embodiment.
FIG. 20 is a table depicting an example of relations between interference power and thresholds for judging the wireless communication state, in the seventh embodiment.

A seventh embodiment incorporates into the second embodiment, a changing of the number of mobile stations judged to require amplification, where based on the interference power within the cell, the base station changes the threshold used for judging the wireless communication state, thereby changing the number of mobile stations. Configuration of the base station in the seventh embodiment is, for example, as depicted in FIG. 19. Configuration the relay station in the seventh embodiment is identical to the second embodiment.

FIG. 19 is a block diagram of the base station according to the seventh embodiment. FIG. 20 is a table depicting an example of relations between interference power and thresholds for judging the wireless communication state, in the seventh embodiment. As depicted in FIG. 19, a base station 81 includes a first measurer 82, a second measurer 83, a calculator 84, the judger 14, the generator 15, and the switch 17. The first measurer 82 is identical to the measurer 12 of the second embodiment. The second measurer 83 is identical to the second measurer 44 of the fourth embodiment. Based on the interference power within the cell, the calculator 84 calculates a threshold to be used for judging the wireless communication state. The relation between the interference power within the cell and the threshold used for judging the wireless communication state may be preliminarily determined by simulation using a computing device, for example. The judger 14 compares the threshold calculated by the calculator 84 and the wireless communication state of the mobile station, and judges whether the mobile station requires amplification. Other aspects of the base station 81 are identical to the second embodiment. In table 85 depicted in FIG. 20, I0, I1, I2, and I3 are numerical values indicating interference power and the relative magnitudes thereof, for example, are I0<I1<I2<I3. Further, k, m, and n are numerical values indicating the thresholds used to judge the wireless communication state and the relative magnitudes thereof, for example, are k>m>n.

Figure 21:
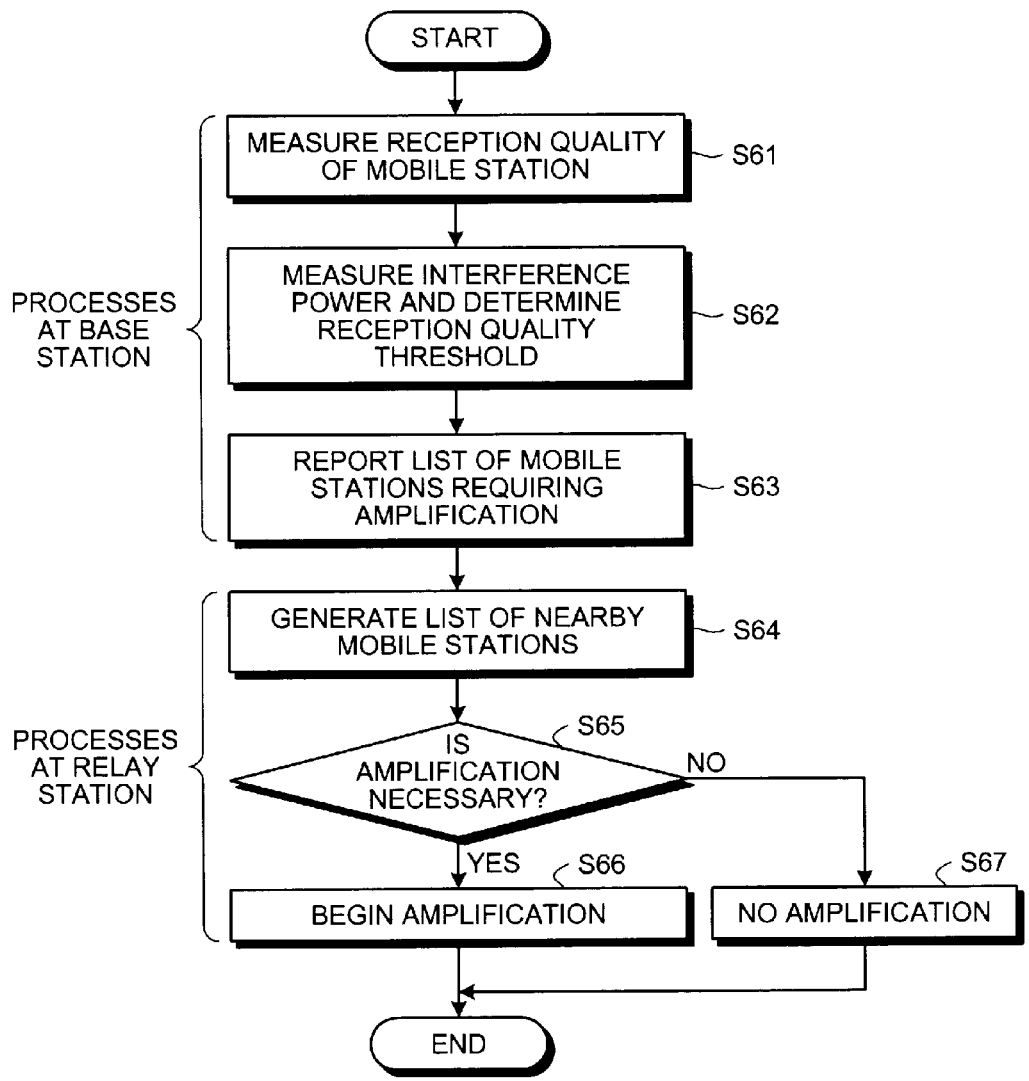
FIG. 21 is a flowchart of the wireless communication method according to the seventh embodiment.

FIG. 21 is a flowchart of the wireless communication method according to the seventh embodiment. As depicted in FIG. 21, when the processes begin, the base station measures the wireless communication state between the base station and each mobile station (step S61). The base station measures the interference power within the cell and based on a preliminarily set correspondence relation, determines a threshold for judging the wireless communication state, corresponding to the interference power within the cell (step S62). The processes hereinafter are identical to steps S12 to S16 in the second embodiment (steps S63 to S67). In this series of processes, the execution timing of step S64 may be after step S63, before step S63, before step S62, or before step S61.

According to the seventh embodiment, effects identical to those of the first embodiment are obtained. Further, when the interference power within the cell is great, the threshold for judging the wireless communication state is reduced and consequently, at the base station, the number of mobile stations judged to have a favorable wireless communication state increases. In other words, the number of mobile stations requiring amplification at a relay station decreases. On the other hand, when the interference power within the cell is small, the threshold for judging the wireless communication state is increased and consequently, at base station, the number of mobile stations judged to have a favorable wireless communication state decreases and the number of mobile stations requiring amplification at a relay station increases. In this manner, control that takes interference power within the cell into consideration can be performed. In the seventh embodiment, configuration may be such that as in the third embodiment, the list of nearby mobile stations is shared with other relays stations.

Figure 22:
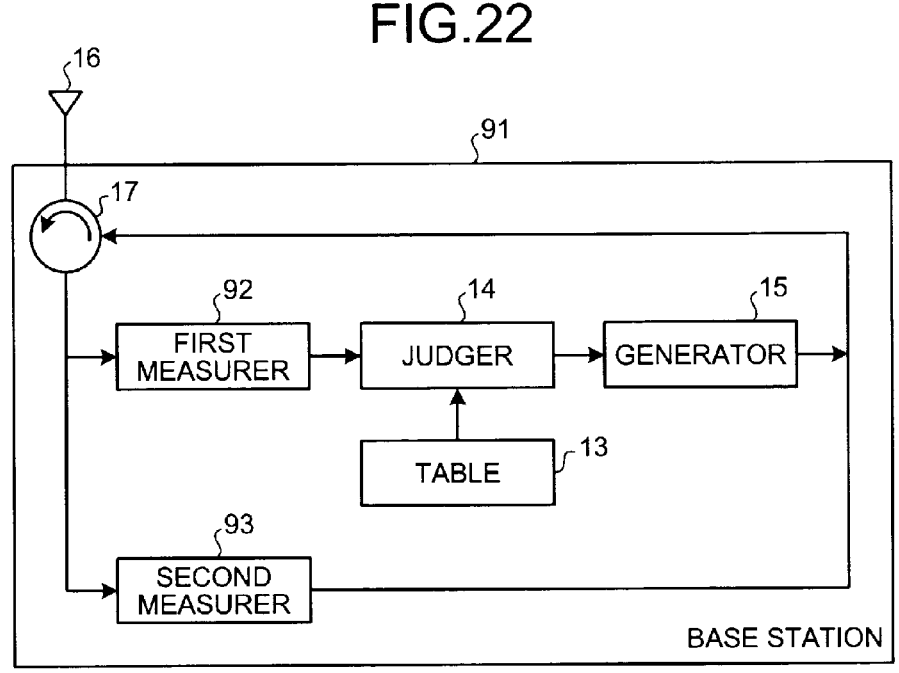
FIG. 22 is a block diagram of a configuration of the base station according to an eighth embodiment.

An eighth embodiment incorporates in to the second embodiment, a changing of the number of mobile stations that are judged to be nearby, where the base station measures the interference power within the cell and the relay station changes based on the interference power within the cell, the threshold that is used to judge the wireless communication state, thereby changing the number of mobile stations that are judged to be nearby. Configuration of the base station in the eighth embodiment is, for example, as depicted in FIG. 22. Configuration of the relay station in the eighth embodiment is, for example, as depicted in FIG. 23.

FIG. 22 is a block diagram of a configuration of the base station according to the eighth embodiment. As depicted in FIG. 22, a base station 91 includes a first measurer 92, a second measurer 93, the table 13, the judger 14, the generator 15, and the switch 17. The first measurer 92 is identical to the measurer 12 of the second embodiment. The second measurer 93 measures the interference power within the cell. Via the switch 17 and the antenna 16, interference power information is reported together with a list of mobile stations judged to require amplification. Other aspects of the base station 91 are identical to the second embodiment.

Figure 23:
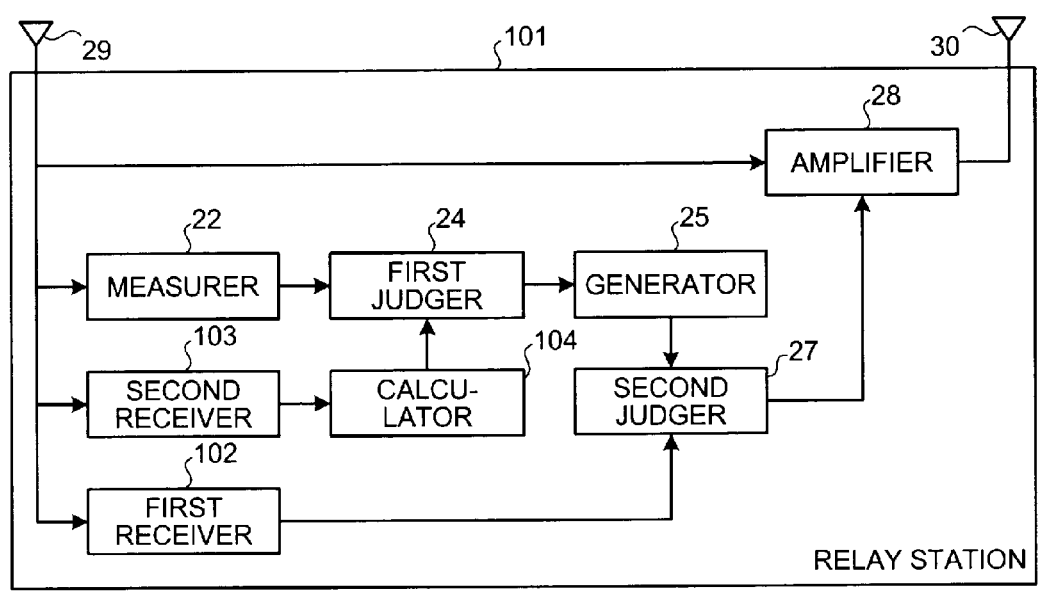
FIG. 23 is a block diagram of the relay station according to the eighth embodiment.

FIG. 23 is a block diagram of the relay station according to the eighth embodiment. As depicted in FIG. 23, a relay station 101 includes a first receiver 102, a second receiver 103, a calculator 104, the measurer 22, the first judger 24, the generator 25, the second judger 27, and the amplifier 28. The first receiver 102 is identical to the receiver 26 of the second embodiment. The second receiver 103 receives and stores interference power information that is reported by base station and concerns the interference power within the cell. The calculator 104 calculates based on the interference power within the cell, a threshold to be used for judging the wireless communication state. The relation between the interference power within the cell and the threshold used for judging the wireless communication state may be preliminarily determined by simulation using a computing device, for example. The relation between the interference power within the cell and the threshold used for judging the wireless communication state, for example, may be identical to the table 85 depicted in FIG. 20. However, in the eighth embodiment, in the table 85 depicted in FIG. 20, the relative magnitudes of k, m, and n, which indicate thresholds for judging the wireless communication state are opposite to that of the seventh embodiment. The first judger 24 compares the threshold calculated by the calculator 104 and the wireless communication state of the mobile station, and for example, judges a mobile station to be nearby if the wireless communication state thereof exceeds the threshold. Other aspects of the relay station 101 are identical to the second embodiment.

Figure 24:
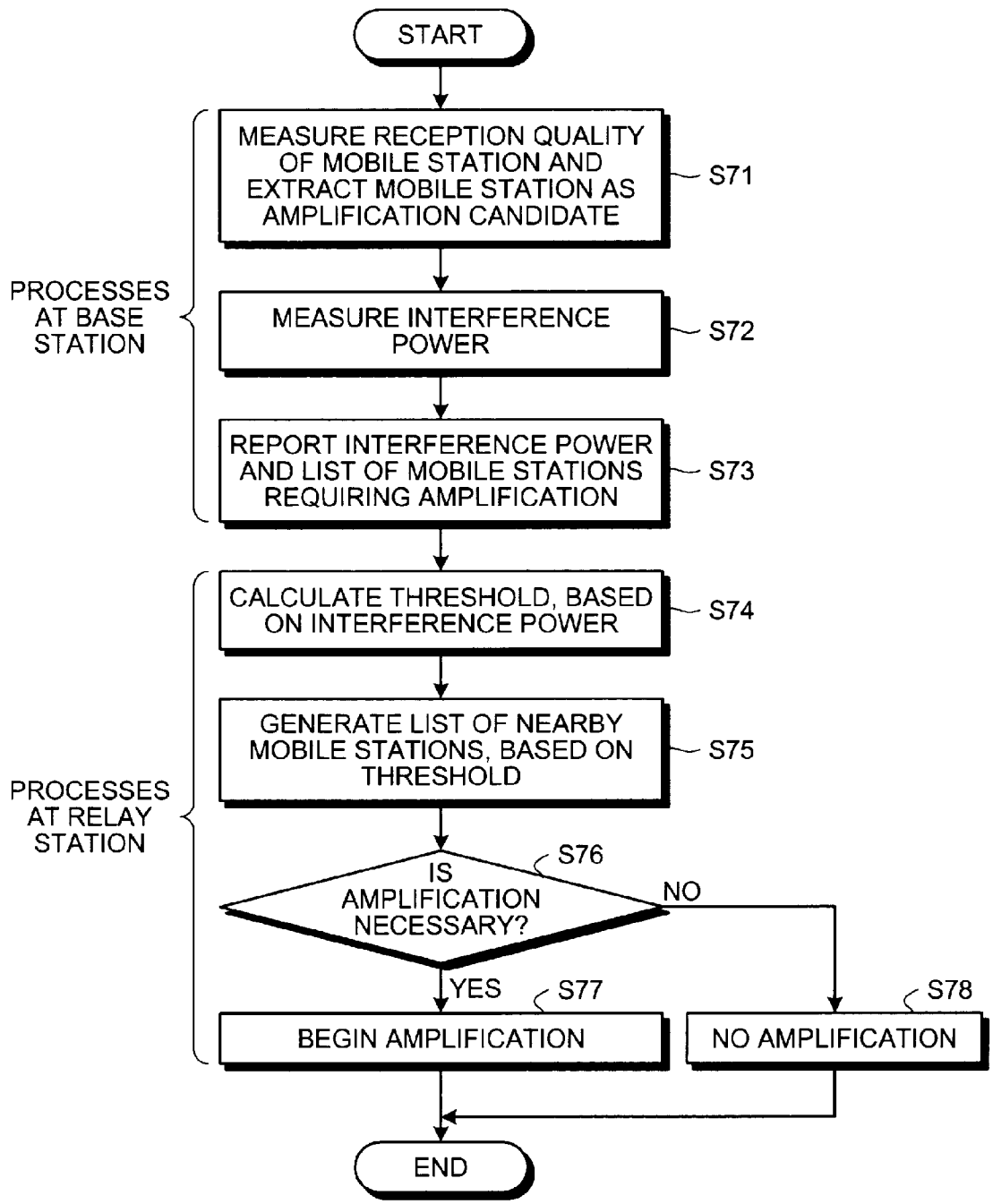
FIG. 24 is a flowchart of the wireless communication method according to the eighth embodiment.

FIG. 24 is a flowchart of the wireless communication method according to the eighth embodiment. As depicted in FIG. 24, when the processes begin, the base station measures the wireless communication state between the base station and each mobile station, compares each wireless communication state with a threshold, and extracts a mobile station candidate for which amplification is to be performed at a relay station (step S71). The base station measure the interference power within the cell (step S72). Based on the mobile station candidates for which amplification is to be performed at a relay station, the base station generates a list of mobile base stations that require amplification, and reports the list and information concerning the interference power within the cell (step S73).

The relay station calculates a threshold for judging the wireless communication state, based on the interference power within the cell (step S74). The relay station measures the wireless communication state between the relay station and each mobile station, compares each wireless communication state with the threshold, and for example, judges a mobile station to be nearby if the wireless communication state thereof exceeds the threshold. In other words, the relay station generates a list of mobile stations that are nearby based on the calculated threshold (step S75). The processes hereinafter are identical to steps S14 to S16 in the second embodiment (step S76 to S78). In this series of processes, step S72 may be executed prior to step S71.

According to the eighth embodiment, effects identical to those of the first embodiment are obtained. Further, when the interference power within the cell is great, the threshold for judging the wireless communication state is increased, and consequently at the relay station, the number of mobile stations judged to have a favorable wireless communication state decreases. In other words, since the number of mobile stations that the relay station judges to be nearby decreases, the overall number of mobile stations for which amplification is to be performed, decreases. On the other hand, when the interference power within the cell is weak, the threshold for judging the wireless communication state is decreased, and consequently at relay station, the number of mobile stations judged to have a favorable wireless communication state increases. In other words, since the number of relay stations that the relay station judges to be nearby increases, the overall number of mobile stations for which amplifications is to be performed, can be increased. In this manner, control can be performed that takes into consideration the interference power within the cell. In the eighth embodiment, configuration may be such that as in the third embodiment, the list of nearby mobile stations is shared with other relay stations.

Figure 25:
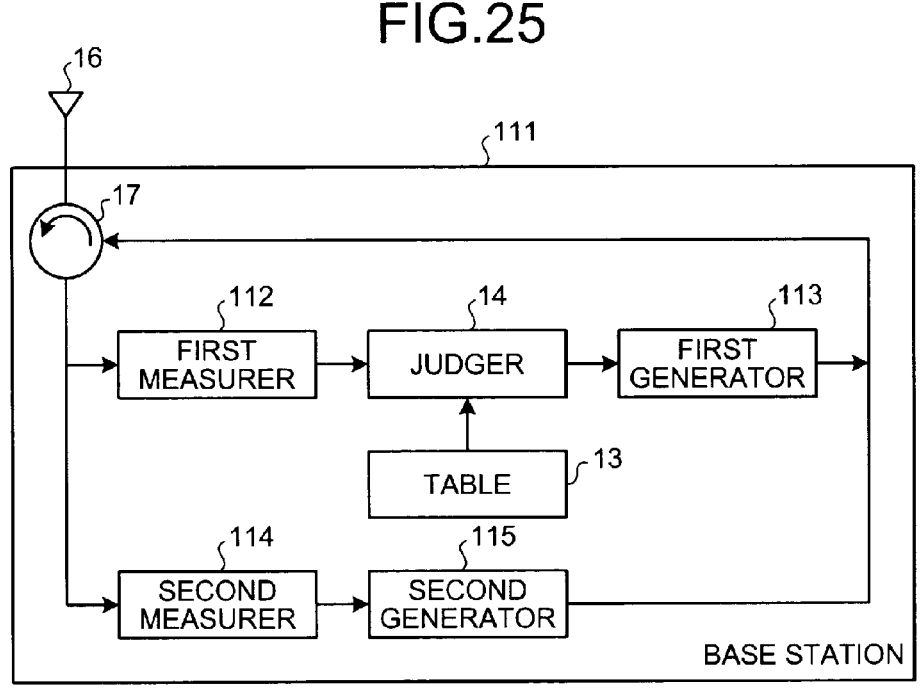
FIG. 25 is a block diagram of the base station according to a ninth embodiment.

A ninth embodiment incorporates into the second embodiment, a changing of the number of mobile stations that the relay station judges to be nearby based on a threshold that is generated by the base station, where the base station measures the interference power within the cell to generate the threshold used at the relay station to judge the wireless communication state. Configuration of the base station in the ninth embodiment is, for example, as depicted in FIG. 25. Configuration of the relay station in the ninth embodiment is, for example, as depicted in FIG. 26.

FIG. 25 is a block diagram of the base station according to the ninth embodiment. As depicted in FIG. 25, a base station 111 includes a first measurer 112, a first generator 113, a second measurer 114, a second generator 115, the table 13, the judger 14, and the switch 17. The first measurer 112 and the first generator 113 are respectively identical to the measurer 12 and the generator 15 of the second embodiment. The second measurer 114 measures the interference power within the cell. Based on the interference power within the cell, the second generator 115 generates a threshold that is used at the relay station, to judge the wireless communication state. Via the switch 17 and the antenna 16, the threshold used at the relay station, to judge the wireless communication state is reported together with the list of mobile stations that require amplification. Other aspects of the base station 111 are identical to the second embodiment.

Figure 26:
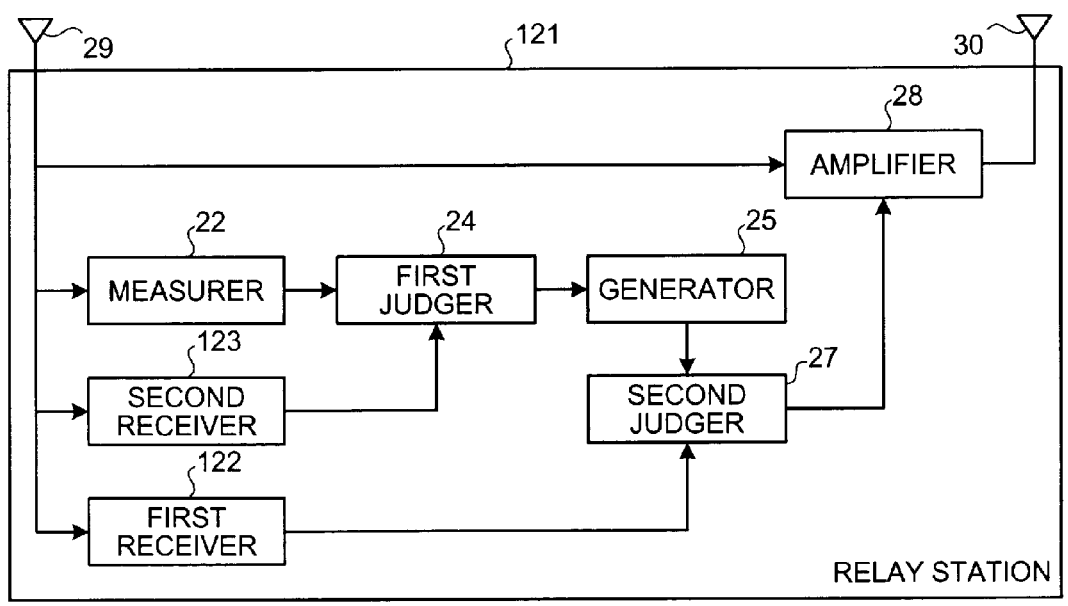
FIG. 26 is a block diagram of a configuration of the relay station according to the ninth embodiment.

FIG. 26 is a block diagram of a configuration of the relay station according to the ninth embodiment. As depicted by FIG. 26, a relay station 121 includes a first receiver 122, a second receiver 123, the measurer 22, the first judger 24, the generator 25, the second judger 27, and the amplifier 28. The first receiver 122 is identical to the receiver 26 of the second embodiment. The second receiver 123 receives and stores the threshold that is reported by base station and used at the relay station for judging the wireless communication state. The first judger 24 compares the threshold stored by the second receiver 123 and the wireless communication state of the mobile station, and for example, judges a mobile station to be nearby if the wireless communication state thereof exceeds the threshold. Other aspects of the relay station 121 are identical to the second embodiment.

FIG. 27 is a flowchart of the wireless communication method according to the ninth embodiment. As depicted in FIG. 27, when the processes begin, the base station measures the wireless communication state between the base station and each mobile station, compares each wireless communication state with a threshold, and extracts a mobile station candidate for which amplification is to be performed at a relay station (step S81). The base station measures the interference power within the cell, and based on the interference power within the cell, determines a threshold to be used the judge the wireless communication state, at the relay station (step S82). Based on the mobile station candidates for which amplification is to be performed at the relay station, the base station generates a list of mobile stations requiring amplification, and reports the list and the threshold to be used at the relay station, to judge the wireless communication state (step S83).

The relay station measures the wireless communication state between the relay station and each mobile station, compares each wireless communication state with the threshold, and for example, judges a mobile station to be nearby if the wireless communication state thereof exceeds the threshold. In other words, the relay station generates a list of nearby mobile stations base station, based on the generated threshold (step S84). The processes thereinafter are identical to steps S14 to S16 in the second embodiment (steps S85 to S87). In this series of processes, step S82 may be executed prior to step S81.

According to the ninth embodiment, effects identical to those of the first embodiment are obtained. Further, similar to the eighth embodiment, control that takes interference power within the cell into consideration, can be performed. In the ninth embodiment, as in the third embodiment, the list of nearby mobile stations may be shared with other relay stations.

According to the disclosed base station, relay station, wireless communication system, and wireless communication method, a relay station can prevented from becoming a source of interference.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A relay station comprising:
    a selector that, based on wireless communication states with each mobile station, selects a mobile station candidate for which amplification is to be performed by the relay station; and
    an amplifier that performs amplification, based on first information that is related to a mobile station for which amplification is to be performed by the relay station and that is reported by a base station, and second information that is related to the mobile station candidate selected by the selector, wherein the first information reported by the base station includes a gain factor that is selected based on a number of mobile stations for which amplification is to be performed, wherein the second information is shared between the relay station and at least one other relay station and based on the first information, the second information of the relay station, and the shared second information of the at least one other relay station, the relay station judges whether to perform amplification, and wherein the relay station is further configured to transmit a list of nearby mobile stations to the at least one other relay station by a wired line.

2. The relay station according to claim 1, further configured to change a specified number of mobile stations determined to be nearby wherein the specified number of mobile stations determined to be nearby is based on a threshold and wherein the relay station changes the threshold based on an interference power level within a cell, the interference power level within the cell measured by the base station.

3. The relay station according to claim 1, further configured to change a specified number of mobile stations determined to be nearby wherein the specified number of mobile stations determined to be nearby is based on a threshold that is generated by the base station, wherein the base station measures an interference power level within a cell to generate the threshold used at the relay station to determine the specified number of mobile stations nearby.

4. A wireless communication system comprising:
    a base station that includes:
        a first selector that, based on a wireless communication state with each mobile station, selects a mobile station for which amplification is to be performed at a relay station,
        a reporter that reports first information related to the mobile station selected by the first selector, wherein, the reporter has a function of transmitting report information to the relay station and reports as the report information, the information related to the mobile station and information concerning a gain factor that is selected based on a number of mobile stations for which amplification is to be performed; and
    a relay station that includes:
        a second selector that based on the wireless communication state with each mobile station, selects a mobile station candidate for which amplification is to be performed by the relay station, and
        an amplifier that performs amplification, based on the first information and second information that is related to the mobile station candidate selected by the second selector, wherein the second information is shared between the relay station and at least one other relay station and based on the first information, the second information of the relay station, and the shared second information of the at least one other relay station, the relay station judges whether to perform amplification, and wherein the relay station is further configured to transmit a list of nearby mobile stations to the at least one other relay station by a wired line.

5. The wireless communication system according to claim 4, wherein
    the base station selects, based on interference power within a cell and the wireless communication state with the mobile station, the mobile station for which amplification is to be performed at the relay station.

6. The wireless communication system according to claim 4, wherein
    the base station selects the gain factor, based on interference power within a cell; and reports as the first information, information concerning the gain factor, and
    the relay station controls the gain factor, based on the information concerning the gain factor.

7. The wireless communication system according to claim 4, wherein
    the relay station selects the mobile station candidate, based on the wireless communication state with the mobile station and interference power within a cell.

8. The wireless communication system according to claim 4, wherein
    the base station selects the mobile station, based on interference power within a cell and the wireless communication state with the mobile station.

9. The wireless communication system according to claim 4, wherein
    the base station selects the gain factor, based on interference power within a cell; and reports as the first information, information concerning the gain factor, and
    the relay station controls the gain factor, based on the information concerning the gain factor.

10. The wireless communication system according to claim 4, wherein the relay station is further configured to change a specified number of mobile stations determined to be nearby wherein the specified number of mobile stations determined to be nearby is based on a threshold and wherein the relay station changes the threshold based on an interference power level within a cell, the interference power level within the cell measured by the base station.

11. The wireless communication system according to claim 4, wherein the relay station is further configured to change a specified number of mobile stations determined to be nearby wherein the specified number of mobile stations determined to be nearby is based on a threshold that is generated by the base station, wherein the base station measures an interference power level within a cell to generate the threshold used at the relay station to determine the specified number of mobile stations nearby.

12. A wireless communication method comprising:
   first selecting at a base station and based on a wireless communication state with each mobile station, a mobile station for which amplification is to be performed at a relay station;
   reporting by the base station, first information related to the mobile station selected at the first selecting, wherein, the reporting includes a function of transmitting report information to the relay station and reports as the report information, the information related to the mobile station and information concerning a gain factor that is selected based on a number of mobile stations for which amplification is to be performed;
   second selecting at the relay station and based on the wireless communication state with each mobile station, a mobile station candidate for which amplification is to be performed by the relay station; and
   amplifying at the relay station, based on the first information and second information that is related to the mobile station candidate selected at the second selecting, wherein the second information is shared between the relay station and at least one other relay station and based on the first information, the second information of the relay station, and the shared second information of the at least one other relay station, the relay station judges whether to perform amplification, and wherein the relay station is further configured to transmit a list of nearby mobile stations to the at least one other relay station by a wired line.

13. The wireless communication method according to claim 12, further comprising,
   changing, at the relay station, a specified number of mobile stations determined to be nearby wherein the specified number of mobile stations determined to be nearby is based on a threshold and wherein the relay station changes the threshold based on an interference power level within a cell, the interference power level within the cell measured by the base station.

14. The wireless communication method according to claim 12, further comprising,
   changing, at the relay station, a specified number of mobile stations determined to be nearby wherein the specified number of mobile stations determined to be nearby is based on a threshold that is generated by the base station, wherein the base station measures an interference power level within a cell to generate the threshold used at the relay station to determine the specified number of mobile stations nearby.

* * * * *